US012175835B2

(12) United States Patent
Shigeta

(10) Patent No.: US 12,175,835 B2
(45) Date of Patent: Dec. 24, 2024

(54) MANAGEMENT SYSTEM FOR TABLE GAMES, SUBSTITUTE CURRENCY FOR GAMING, INSPECTION DEVICE, AND MANAGEMENT SYSTEM FOR SUBSTITUTE CURRENCY FOR GAMING

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 0 days.

(21) Appl. No.: 17/972,084

(22) Filed: Oct. 24, 2022

(65) Prior Publication Data

US 2023/0038847 A1 Feb. 9, 2023

Related U.S. Application Data

(63) Continuation of application No. 16/871,461, filed on May 11, 2020, now Pat. No. 11,514,751, which is a (Continued)

(30) Foreign Application Priority Data

Aug. 3, 2015 (JP) ................................ 2015-163213
Oct. 1, 2015 (JP) ................................ 2015-206735

(Continued)

(51) Int. Cl.
*G07F 17/32* (2006.01)
*A63F 1/18* (2006.01)

(Continued)

(52) U.S. Cl.
CPC ............ *G07F 17/3241* (2013.01); *A63F 1/18* (2013.01); *A63F 3/00157* (2013.01);

(Continued)

(58) Field of Classification Search
None
See application file for complete search history.

(56) References Cited

U.S. PATENT DOCUMENTS 3,968,582 A 7/1976 Jones
3,983,646 A * 10/1976 Howard ................ A44C 21/00
40/27.5

(Continued)

FOREIGN PATENT DOCUMENTS

JP 64-500243 A 2/1989
JP H05237213 A 9/1993

(Continued)

OTHER PUBLICATIONS

International Application No. PCT/JP2016/072360, International Search Report mailed Oct. 25, 2016.

(Continued)

*Primary Examiner* — Peter J Iannuzzi
(74) *Attorney, Agent, or Firm* — NORTON ROSE FULBRIGHT US LLP

(57) ABSTRACT

A detection system according to the present invention includes a control device detecting fraud performed in a game table by using a result of an image analysis performed by an image analyzing device, and substitute currency for gaming used for this detection system has a multi-layer structure in which a plurality of plastic layers having different colors are stacked, a coloring layer is included at least in the middle, and white layers or thin-color layers (may be layers having a color thinner than that of the coloring layer) are stacked on both sides of the coloring layer disposed in the middle. A multi-layer structure, in which a coloring layer is included, and white layers or thin-color layers (the layers may be layers of a color that is thinner than that of the (Continued)

coloring layer) are stacked on both sides of the coloring layer of this middle, is employed.

17 Claims, 24 Drawing Sheets

Related U.S. Application Data continuation of application No. 15/750,012, filed as application No. PCT/JP2016/072360 on Jul. 29, 2016, now Pat. No. 10,706,675.

(30) Foreign Application Priority Data

Nov. 19, 2015 (JP) ................................ 2015-240631
Feb. 1, 2016 (JP) ................................ 2016-030443

(51) Int. Cl.
*A63F 3/00* (2006.01)
*A63F 9/24* (2006.01)
*A63F 11/00* (2006.01)
*G06Q 50/10* (2012.01)
*G06Q 50/34* (2012.01)

(52) U.S. Cl.
CPC .............. *A63F 11/00* (2013.01); *G06Q 50/10* (2013.01); *G06Q 50/34* (2013.01); *G07F 17/322* (2013.01); *G07F 17/3248* (2013.01); *G07F 17/3293* (2013.01); *A63F 2009/2435* (2013.01); *A63F 2009/2489* (2013.01); *A63F 2250/58* (2013.01)

(56) References Cited

U.S. PATENT DOCUMENTS 4,026,309 A 5/1977 Howard
4,814,589 A 3/1989 Storch et al.
5,166,502 A 11/1992 Rendleman et al.
5,283,422 A 2/1994 Strorch et al.
5,673,503 A 10/1997 Rendleman
5,676,376 A 10/1997 Valley
5,781,647 A * 7/1998 Fishbine ................ G07D 5/005 235/375
5,895,321 A 4/1999 Gassies et al.
6,254,002 B1 * 7/2001 Litman .................. G06K 7/084 235/493
6,514,374 B1 2/2003 Zurawski et al.
8,723,652 B2 5/2014 Delaney et al.
10,600,279 B2 * 3/2020 Shigeta .................. A44C 21/00
2002/0042298 A1 4/2002 Soltys et al.
2003/0174864 A1 * 9/2003 Lindquist .................. G07F 5/22 382/100
2003/0220136 A1 * 11/2003 Soltys ................. G07F 17/3288 463/25
2004/0219975 A1 11/2004 Soltys et al.
2005/0051965 A1 * 3/2005 Gururajan ............... G07F 17/32 273/292
2006/0019739 A1 * 1/2006 Soltys ................. G07F 17/3241 463/25
2006/0160608 A1 * 7/2006 Hill ..................... G07F 17/3293 463/25
2007/0060304 A1 * 3/2007 Jeon .................... G07F 17/3241 463/25
2007/0077987 A1 4/2007 Gururajan et al.
2007/0105616 A1 * 5/2007 Chapet ................. G06K 19/041 463/25
2007/0111773 A1 * 5/2007 Gururajan ........... G07F 17/3202 463/11
2007/0184898 A1 * 8/2007 Miller .................... G07D 9/002 463/29
2007/0278314 A1 * 12/2007 Chapet ................... A44C 21/00 425/588
2008/0113783 A1 5/2008 Czyzewski et al.
2009/0075725 A1 3/2009 Koyama
2009/0170595 A1 7/2009 Walker
2009/0233699 A1 9/2009 Koyama
2010/0105486 A1 4/2010 Shigeta
2010/0130288 A1 5/2010 Shigeta
2010/0210355 A1 8/2010 Koyama et al.
2010/0240446 A1 9/2010 Koyama et al.
2011/0052049 A1 * 3/2011 Rajaraman ................ G06T 7/12 382/165
2012/0252564 A1 10/2012 Moore et al.
2013/0316797 A1 11/2013 Gelinotte et al.
2014/0200071 A1 * 7/2014 Czyzewski ......... G07F 17/3288 463/25
2014/0332595 A1 11/2014 Moreno et al.
2014/0332597 A1 11/2014 Gelinotte et al.
2014/0370960 A1 12/2014 Mosley et al.
2015/0074028 A1 3/2015 Miyashita
2016/0098606 A1 4/2016 Nakamura et al.
2016/0335837 A1 11/2016 Shigeta
2018/0247134 A1 * 8/2018 Bulzacki ................ G06V 10/44
2018/0350191 A1 12/2018 Shigeta

FOREIGN PATENT DOCUMENTS

JP H06-134140 A 5/1994
JP 2008250847 A 10/2008
JP 2009018021 A 1/2009
JP 2009-066172 A1 4/2009
JP 2009066172 A 4/2009
JP 2009219588 A 10/2009
JP 2010-213940 A 9/2010
JP 2010187807 A 9/2010
JP 2011067339 A 4/2011
JP 2014504164 A 2/2014
JP 2014-095974 A 5/2014
JP 2015014819 A 1/2015
JP 2015053008 A 3/2015
JP 2015070401 A 4/2015
JP 2017505661 A 2/2017
JP 6736557 B2 8/2020
WO 2004107904 A1 12/2004
WO 2008/120749 A1 10/2008
WO 2012058401 A2 5/2012
WO 2012063465 A1 5/2012
WO 2015/107902 A1 7/2015

OTHER PUBLICATIONS

European Application No. 16832952.2, European Search Report mailed Feb. 5, 2019.
Singapore Office Action mailed Sep. 30, 2019 for SG patent application 11201800952Y.
Japanese Office Action mailed Jul. 16, 2019 for JP patent application 2017-532577.
New Zealand Further Examination Report mailed Oct. 17, 2019 for NZ patent application 739654.
Chinese Office Action mailed Aug. 5, 2020 for CN patent application 201680045852.X.
European Search Report mailed Feb. 5, 2019 for EP patent application 16832952.2.
Japanese Office Action mailed Sep. 7, 2021 for JP patent application 2020-121036.
Japanese Allowance mailed Mar. 22, 2022 for JP patent application 2020-121036.
European Search Report dated Sep. 8, 2022 for EP patent application 22174545.8.
Japanese Office Action issued on Jan. 31, 2023 for JP Patent Application No. 2022-071264.
Australian Examination Report No. 3 issued on Mar. 25, 2024 for AU Patent Application No. 2022200450.
Japanese Office Action issued on Aug. 15, 2023 for JP Patent Application No. 2022-071264.

(56) References Cited

OTHER PUBLICATIONS

Korean Office Action issued on Oct. 28, 2024 for KR Patent Application No. 10-2023-7006818.

* cited by examiner

MANAGEMENT SYSTEM FOR TABLE GAMES, SUBSTITUTE CURRENCY FOR GAMING, INSPECTION DEVICE, AND MANAGEMENT SYSTEM FOR SUBSTITUTE CURRENCY FOR GAMING

CROSS-REFERENCE TO RELATED APPLICATIONS

This application is a continuation of U.S. patent application Ser. No. 16/871,461 filed May 11, 2020, which is a continuation of U.S. patent application Ser. No. 15/750,012 filed Feb. 2, 2018, now U.S. Pat. No. 10,706,675, which is a national phase application under 35 U.S.C. § 371 from Int'l App. No. PCT/JP2016/072360 filed Jul. 29, 2016, which claims the benefit of JP Pat. App. No. 2015-163213 filed Aug. 3, 2015, JP Pat. App. No. 2015-206735 filed Oct. 1, 2015, JP Pat. App. No. 2015-240631 filed Nov. 19, 2015, and JP Pat. App. No. 2016-30443 filed Feb. 1, 2016, the content of each of which is incorporated herein by reference.

DESCRIPTION

Technical Field

The present invention relates to a management system for table games in a game house, and more particularly, to a technology for detecting fraud.

Background Art

In game houses such as casinos, there are various attempts for preventing fraud. A game house includes monitoring cameras used for monitoring fraud and prevents fraud by determining fraud of a game, fraud according to collection or repayment of chips that is different from the result of win/loose, and the like based on an image acquired from the monitoring camera.

Meanwhile, in order to perceive the number or a total amount of bet chips, it has been proposed to perceive the amount of chips by attaching a IC tag to each chip.

In a card game monitoring system disclosed in PCT/JP2015/000171, it is determined whether or not chips placed on a game table is collected or re-payed according to a result of win/loose by performing an image analysis of the movement of chips, whereby fraud is monitored.

SUMMARY OF THE INVENTION

An object of the present invention is to provide a new management system that detects fraud in a game in a game house or a mistake or fraud when substitute currency for gaming is bet or is paid off.

A management system of a table game according to the present invention is a management system of a table game comprising: a card distributing device that determines and displays a result of winning/losing of each game in a game table; a measurement device that measures types and quantities of substitute currency for gaming placed on the game table by using a camera; and a management control device that specifies and stores a position, types, and quantities of the substitute currency for gaming placed on the game table by a game participant by using a result of the measurement performed by the measurement device in each game, wherein the substitute currency for gaming forms a stripe pattern on a side face in a stacking direction by employing a multi-layer structure in which a plurality of plastic layers having different colors are stacked, a coloring layer is included at least in the middle, and white layers or thin-color layers are stacked on both sides of the coloring layer disposed in the middle, and has a configuration enabling the type of the substitute currency for gaming to be specified by the coloring layer, and the management control device has a calculation function of determining the game participant as a winner/loser in each game and calculating a balance of a casino side on the game table for each game by using the result of winning/losing acquired from the card distributing device and the result of the measurement of the position, the types, and the quantities of the substitute currency for gaming placed by the game participant.

DESCRIPTION OF EMBODIMENTS

Figure 1:
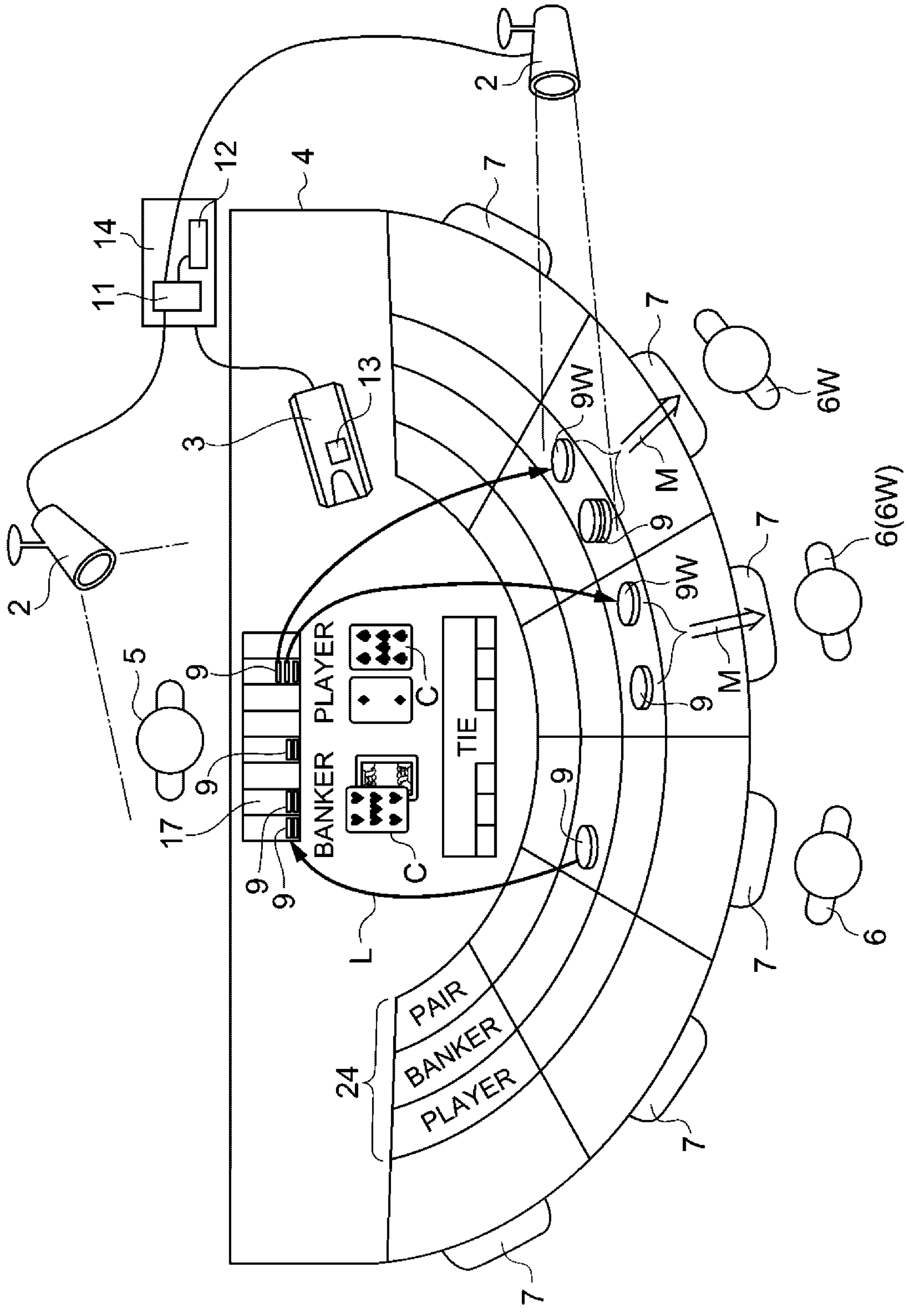
FIG. 1 is a diagram illustrating an overview of the whole fraud detecting system in a game house including a plurality of gaming tables according to an embodiment of the present invention.

In game houses such as casinos, while chips are piled to have a high volume and is placed on a game table, there is a problem in that a total amount cannot be correctly read by a reading device for IC tags disposed under the game table, and, when the sensitivity of the reading device is increased, chips placed at a different position (winning/losing depends on the position) are added, and there is a problem in that a total amount of chips at each position cannot be perceived. In addition, in imaging using a camera, there is a problem in that a blind area is generated according to the viewing angle of the camera, or chips enter a shadow due to overlapping, and thus, there is a problem in that a total amount of chips cannot be perceived.

In addition, according to player's squeeze (a behavior for seeing a card little by little by bending a card facing the back side while enjoying the rank of the card or the like) of a card, which is frequently performed in a Baccarat game, or the like, the card is bent, and there is a problem in that the rank and the suit of the card cannot be determined through an analysis of an image acquired from a camera.

Furthermore, fraud on a game table has been advanced, and there is a new problem in that fraud using an advanced betting method or the like that cannot be found in simple detection of a large winning amount on a game table or the like cannot be found by using a camera or tracking a winning amount. In addition, the prevention of fraud according to a conspiracy of a dealer and a player is not sufficient according to the conventional technology.

In order to solve the various problems described above, a detecting system of fraud according to an embodiment in a game house including a plurality of game tables is a fraud detecting system in a game house including a plurality of game tables and includes: a game recording device that records a state of progress of a game performed on each of the game table as a video including a dealer and a player through a camera; an image analyzing device that performs an image analysis of the recorded video of the state of progress of the game; a card distributing device that determines and displays a result of winning/losing of each game in the game table; and an intelligent-type control device that detects fraud performed in the game table by using a result of the image analysis performed by the image analyzing device and the result of winning/losing determined by the card distributing device.

In addition, in the detecting system, the card distributing device has a structure capable of reading the rank of each distributed card, and the intelligent-type control device has a structure capable of determining match/mismatch by combining information of a rank acquired by the image analyzing device from a video of each card distributed in the game table and information of a rank of a card read by the card distributing device.

In addition, in the detecting system, the image analyzing device or the intelligent-type control device has an artificial intelligence-utilizing or deep-learning structure capable of acquiring information of a rank of a card from a card that is distributed in the game table and is bent by the player or is contaminated.

Furthermore, in the detecting system, the intelligent-type control device acquires the position, the kind, and the quantity of chips that are bet by each player through the image analyzing device and determines whether or not collection of losing chips that are bet by each player and repayment for the winning chips are appropriately performed according to the result of winning/losing of the game by analyzing the video of the state of progress of the game through the image analyzing device.

In addition, in the detecting system, the image analyzing device or the intelligent-type control device has an artificial intelligence-utilizing or deep-learning structure capable of acquiring information of the kind, the quantity, and the position of the bet chips also in a state in which a plurality of chips placed on a game table is in a state in which a part or the whole one is hidden according to a hidden area of the camera.

Furthermore, in the detecting system, the intelligent-type control device has an artificial intelligence-utilizing or deep-learning structure capable of comparing/calculating whether or not the amount of chips perceived in a dealer's chip tray in the game table is increased/decreased according to the collection of losing chips that are bet by each player and a paid amount for winning chips based on a result of winning/losing of the game after the game ends and a settlement.

In addition, in the detecting system, the intelligent-type control device has an artificial intelligence-utilizing or deep-learning structure capable of acquiring the position and the amount of chips that are bet at each play position of the game table and extracting an abnormal situation by comparing a winning/losing history and an acquired amount of chips for each player that are acquired from a result of winning/losing of each game with statistical data of past game.

Furthermore, in the detecting system, the intelligent-type control device has an artificial intelligence-utilizing or deep-learning structure capable of extracting an abnormal situation by comparing a state in which the amount of the bet chips at the time of losing is smaller than the amount of the bet chips at the time of losing at a play position of a game table with statistical data of past games.

In addition, in the detecting system, the intelligent-type control device has a structure capable of specifying whether the abnormal situation is extracted through the image analyzing device or an individual player at a play position at which winning of a predetermined amount of more is acquired.

Furthermore, in the detecting system, the intelligent-type control device has a warning function for giving a notification of the presence of a specific player at another game table when the specified player leaves the seat and arrives at the another game table.

In order to solve the various problems described above, according to the embodiment, a detecting system of fraud in a game house including a plurality of game tables includes: a game recording device that records a state of progress of a game performed on each of the game table as a video including a dealer and a player through a camera; a card distributing device that determines a result of winning/losing of each game in the game table; an image analyzing device that performs an image analysis of the recorded video of the state of processing of the game; and an intelligent-type control device that can detect bills and chips in the game table by using a result of the image analysis performed by the image analyzing device, and the image analyzing device or the intelligent-type control device has an artificial intelligence-utilizing or deep-learning structure capable of detecting exchange of bills and chips in the game table in a situation other than in the middle of dealing cards based on information acquired from the card distributing device or the dealer, recognizing a total amount of genuine bills verified using among the bills and capable of recognizing a total amount of chips also in a state in which a plurality of chips come out onto the game table as an exchange target is in a state in which a part or the whole one is hidden due to a blind area of the camera and comparing a total amount of bills come out from the player onto the game table and a total amount of chips come out from the dealer with each other and determining whether or not the both quantities match.

In addition, in the detecting system, the intelligent-type control device has an artificial intelligence-utilizing or deep-learning structure capable of comparing/calculating whether or not the amount of chips perceived in a dealer's chip tray in the game table is increased/decreased according to a paid amount of chips corresponding to exchanged bills after a settlement through exchange of bills and chips.

Furthermore, in the detecting system, the intelligent-type control device has an artificial intelligence-utilizing or deep-learning structure capable of comparing/calculating match/mismatch of an input amount of bills according to a dealer's input and a total amount of bills according to a result of the image analysis performed by the image analyzing device after the settlement through exchange of bills and chips. In addition, the intelligent-type control device has an artificial intelligence-utilizing or deep-learning structure capable of comparing/calculating match/mismatch of a total input amount of bills according to a dealer's input in the game table for which the dealer is responsible and a total amount of bills according to a result of the image analysis performed by the image analyzing device.

According to a system according to the embodiment, also when a card is bent according to player's squeeze of the card that is frequently performed in a Baccarat game or the like, the rank and the suit of the card can be determined through an image analysis, and a total amount of chips disposed in the blind area or overlapping chips can be perceived together with the position. In addition, fraud at the time of exchange of bills and chips can be detected as well.

Hereinafter, an overview of the whole detecting system of fraud in a game house including a plurality of game tables according to a first embodiment of the present invention will be described with referring to figures. FIG. 1 is a diagram illustrating an overview of the whole system, the fraud detecting system in a game house including a plurality of game tables 4 includes: a game recording device 11 that records the state of progress of a game performed in the game table 4 as a video including players 6 and a dealer 5 through a plurality of camera 2; an image analyzing device 12 that performs an image analysis of the recorded video of the state of process of the game; and a card distributing device 3 that determines and displays a result of winning/losing of each game in the game table 4. The card distributing device 3 is a so-called electronic shooter that has already been used by persons skilled in the art and has rules of a game programmed in advance and has a structure capable of determining winning/losing of a game by reading information of distributed cards C. For example, in a Baccarat game, winning of the baker, winning of a player, or tie (drawn) is determined basically based on the ranks of two to three cards, and a determination result (a result of winning/losing) is displayed in a display lamp 13.

The detecting system further includes an intelligent-type control device 14 that compares the rank of actual cards according to a result of the image analysis performed by the image analyzing device 12 and a result of winning/losing determined by the card distributing device 3 with each other and detects fraud (mismatch between a sum of ranks of distributed cards and a result of winning/losing) performed in the game table 4. The card distributing device 3 has a structure capable of reading ranks (A, 2,3 to Q, K) and suits (hearts, spades, or the like) of cards C that are manually distributed by the dealer 5, and the intelligent-type control device 14 has a structure capable of determining match/mismatch by collating information of a rank and suites acquired by the image analyzing device 12 (using artificial intelligence) from a video (by using the camera device 2) of cards distributed in the game table 4 and information of cards and suits read by the card distributing device 3 with each other. The image analyzing device 12 and the intelligent-type control device 14 of the detecting system have a structure integrally including a computer formed as one body or by a plurality of configurations, a program, and a memory.

Figure 3:
FIG. 3 is an enlarged diagram of a mark illustrating contamination of a card perceived according to the embodiment of the present invention.

The image analyzing device 12 and the intelligent-type control device 14 have an artificial intelligence-utilizing or deep-learning structure capable of acquiring information of ranks of cards also for cards C that are distributed in the game table 4 and are bent by the player 6 or contaminated. For a contaminated card C, as illustrated in FIG. 3, there is a situation in which it is difficult to determine clubs or spades. Also in such a case, the suite can be determined by an artificial intelligence-utilizing computer or control system, an analysis and a determination of an image using a deep learning (structure) technology. In addition, also in a case where a card is bent according to a player's squeeze of a card, which is frequently performed in a Baccarat game or the like, by using self-learning of examples of many deformations of images or the like, a suit and a rank of a card before deformation can be recognized according to an artificial intelligence-utilizing computer or control system and a deep learning (structure) technology. The artificial intelligence-utilizing computer or control system and the deep learning (structure) technology are known as a person skilled in the art and can be used, and thus, detailed description thereof will not be presented.

Figure 2A:
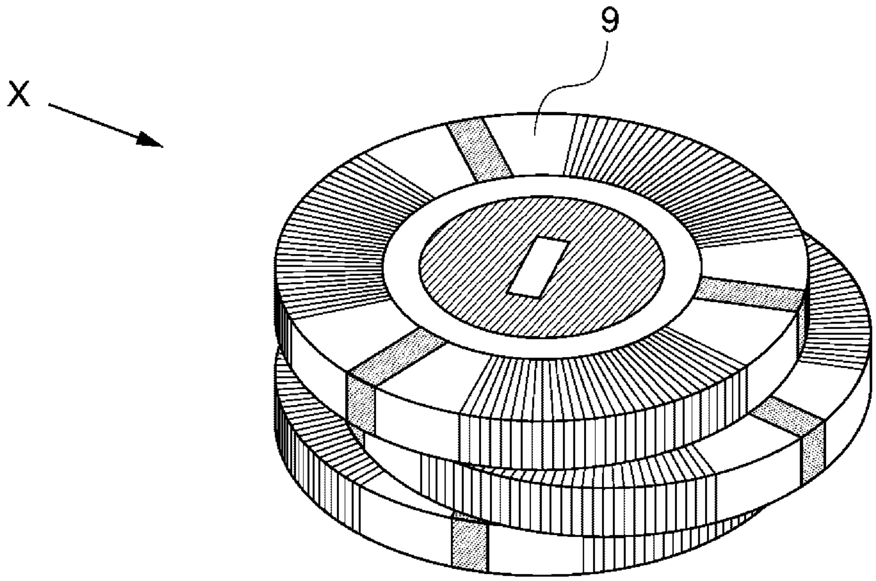
FIG. 2A is a perspective view of chips illustrating an example of another overlapping state of chips perceived according to the embodiment of the present invention.
Figure 2B:
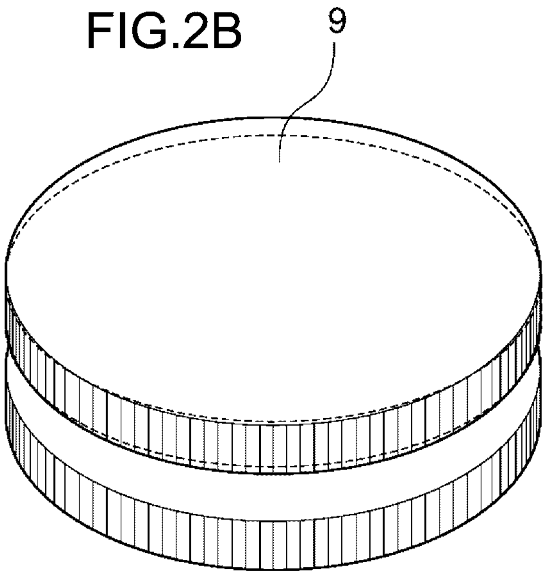
FIG. 2B is a perspective view of chips illustrating an example of another overlapping state of chips perceived according to the embodiment of the present invention.

The intelligent-type control device 14 having an artificial intelligence-utilizing or deep learning structure can perceive a position 24 (position for betting to player, banker, or pair) of chip 9 bet by each player 6, the type (a value of a different amount is assigned to chip 9 for each color) of the bet chips 9 through the camera and the image analyzing device 12. The chips are superimposed with deviations as illustrated in FIG. 2A from a case where the chip 9 is vertically arranged to be superimposed. In such a case, in a case where the camera is positioned in the direction of an arrow X illustrated in FIG. 2A (or the direction of the chip 9 is relatively in a blind area), as illustrated in FIG. 2B, it is assumed that the chip is not visible (enters a blind area). According to the artificial intelligence-utilizing computer or control system or the deep-learning technology, by using a self-learning function or the like, hidden chips due to a blind area or the like are recognized (there are case where a part of one unit of chip is hidden or a case where the whole chip 9 is hidden), and the number of quantity and the like can be correctly perceived. In this way, since a position 24 (position for betting to a player, a banker, or a pair) of chip 9 and the type (a value of a different amount is assigned to chip 9 for each color) and the quantity of the bet chip can be perceived, the intelligent-type control device 14 determines whether or not collection (denoted by an arrow L) of the losing chips bet by each player 6 and payment (9W) for winning chips to a player 6W who has won are properly performed according to a result of winning/losing of a game in accordance with a result of winning/losing of the game determined by the card distributing device 3 in each game by analyzing a video of the state of process of the game through the image analyzing device 12.

The intelligent-type control device 14 can analyze and acquire a total amount of the chips 9 in the chip tray 17 for the dealer 5 in the game table 4 by using the image analyzing device 12 and can compare and calculate whether or not a total amount of the chips 9 inside the chip tray 17 has been increased or decreased according to the amount of collection of the losing chips 9 bet by each player 6 and the amount of the payment 9W for winning chips to a player 6W who has won after the end of the game and the settlement based on a result of winning/losing of the game. A total amount of the chips 9 in the chip tray 17 may be constantly acquired using means such as an RFID, and the intelligent-type control device 14 determines whether or not the increased/decreased amount is correct by analyzing the video of the state of progress of the game through the image analyzing device 12. For this, the artificial intelligence-type or deep-leaning structure is also used.

The intelligent-type control device 14 has an artificial intelligence-utilizing or deep-learning structure capable of acquiring the position (a position for betting on the player, the banker, or the fair) and the amount (the types and quantities) of bet chips at each player position 7 of the game table 4, comparing a winning/losing history of each player 6 and the amount (won amount) of acquired chips that can be acquired based on the result of winning/losing of each game with statistical data of many (big data) games in the past, and extracting an abnormal situation (set in the casino).

Typically, the intelligent-type control device 14 is included which has an artificial intelligence-utilizing or deep-learning structure capable of extracting an occurrence of a won amount of a certain amount (one million dollars) or more and an abnormal situation in which, in a play position 7 of a specific game table 4, a state in which the amount of bet chips is small at the time of losing a game, and the amount of bet chips is large at the time of winning a game is continued for several games and is determined as an abnormal situation based on a comparison with statistical data (big data or the like) of games in the past.

In addition, the intelligent-type control device 14 (integrated with the image analyzing device 12) of the detecting system has a structure capable of extracting an abnormal situation or specifying an individual player 6 at the play position 7 at which winning of a predetermined amount of more is acquired. In such specifying of a player 6, the image of each face is specified with a profit and an identify number (an ID or the like) assigned thereto in the image analyzing device 12. Then, the intelligent-type control device 14 has a warning function for giving a notification of the presence of a specific player in another game table when the specified player 6 leaves a seat and arrives at the another game table. More specifically, a notice is given to a pit manager managing each game table 4 or each table staff (or a dealer), wherein further prevention of an abnormal phenomenon is achieved.

Figure 4:
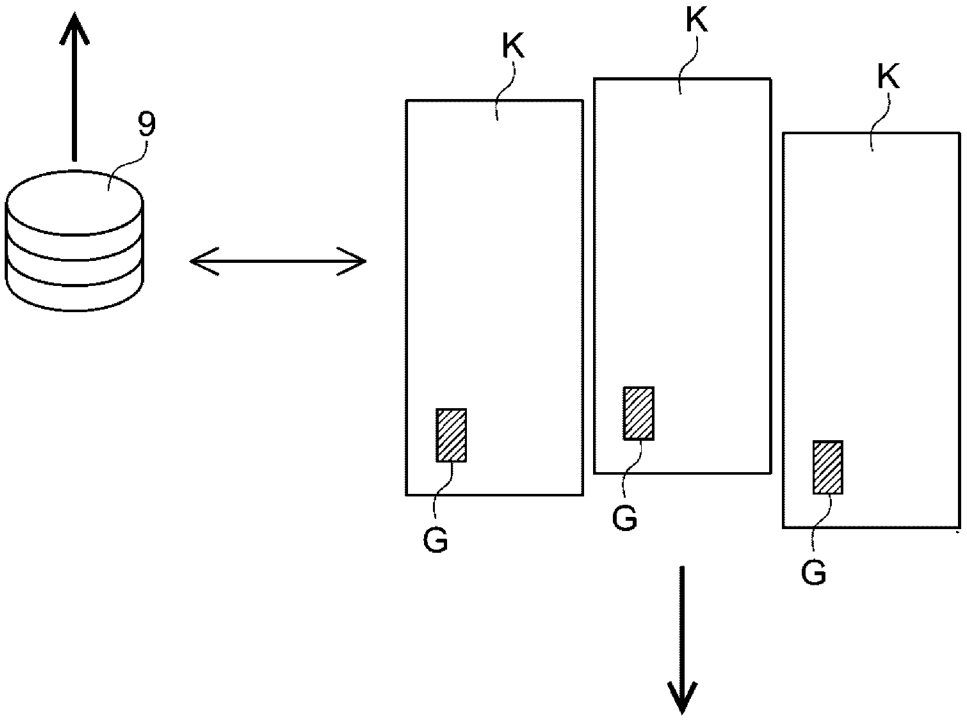
FIG. 4 is an explanatory diagram simplifying a video of the state of exchange of bills and chips perceived according to the embodiment of the present invention.

The fraud detecting system in a game house including a game table according to this embodiment further has a function of performing an inspection at the time of exchange of bills and chips that is frequently performed in the game table 4. In a game house such as a casino, before a game, a player 6 exchanges bills (cash or the like) and chips at a predetermined chip clearing house. However, when all the chips are used, the player 6 can continue the game by exchanging cash (bills) with chips 9 on the game table (a Baccarat table or the like) without leaving the seat from the game table 4. However, here, there is a chance for fraud between the dealer 5 and the player. The exchange of cash (bills) for chips 9 on a game table (for example, a Baccarat table or the like) needs to be performed when a game does not advance. In order to determine winning/losing of a game, the card distributing device 3 can detect the start of dealing of cards and the end of dealing (a time period for determining winning/losing). For this reason, the card distributing device 3 detects a situation other than the distribution (dealing) of cards, and the intelligent-type control device 14 detects exchange of bills and chips 9 on the game table 4 in a situation other than the dealing of cards (illustrated in FIG. 4). Being in the middle of the dealing (or any other situation) of cards can be detected based on information acquired from the operation of the card distributing device 3 or the dealer 5.

Figure 5:
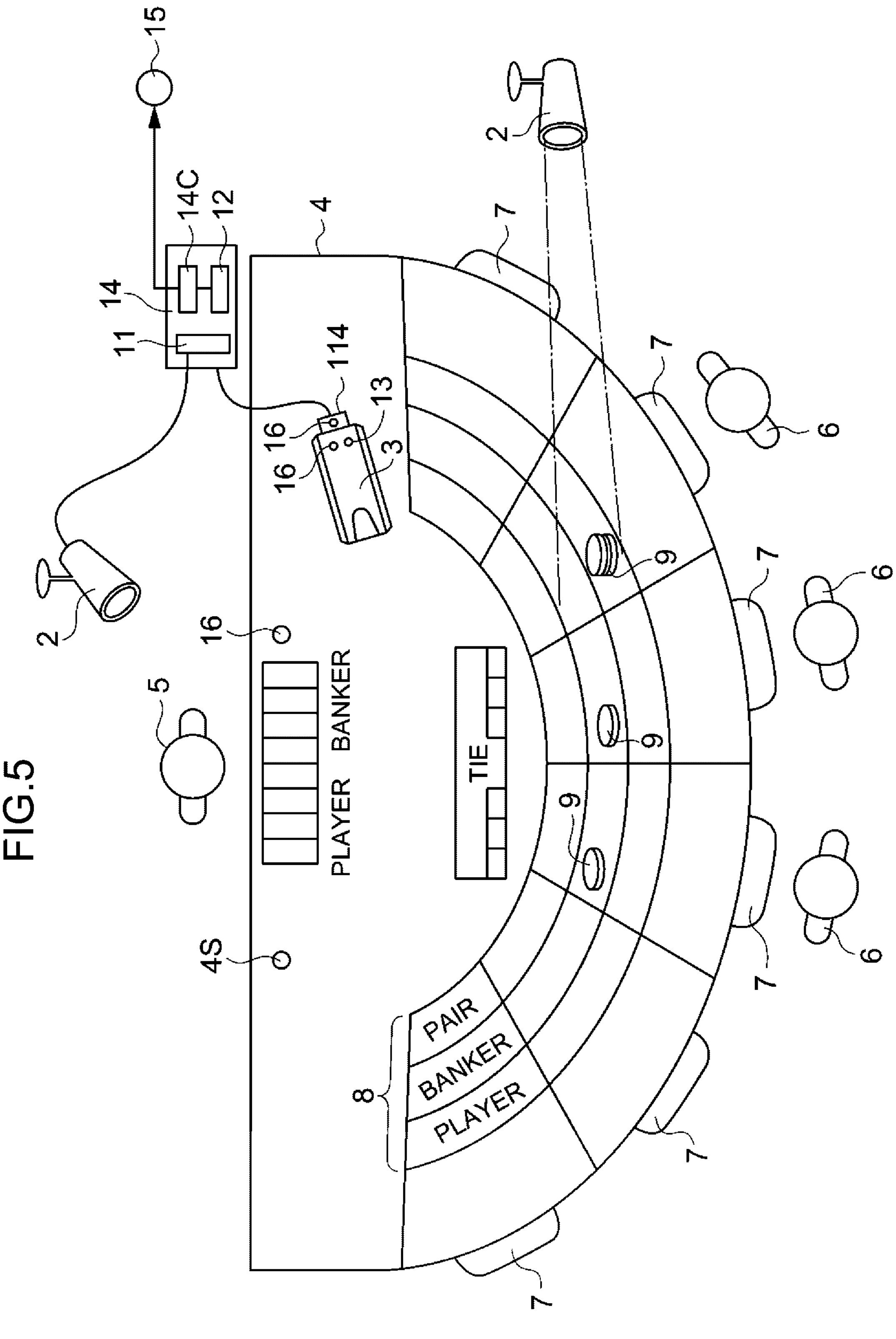
FIG. 5 is a plan view illustrating an overview of the whole management system for table games in a game house according to the embodiment of the present invention.

The control device 14 can recognize the quantity and the amount of bills by performing an image analysis of the surfaces of the bills K. In addition, in the game table 4, it is determined whether or not bills K to be exchanged for substitute currency 120 for gaming are genuine by detecting genuine marks G of the bills by emitting black light. As illustrated in FIG. 5, the control device 14 has an artificial intelligence-utilizing or deep-learning structure verifying the genuine marks G through an image analysis, recognizing a total amount of genuine bills, being capable of recognizing a total amount of substitute currency for gaming even in a state in which a plurality of substitute currency for gaming come out onto the game table as an exchange target is hidden due to a blind area of the camera device 2, comparing a total amount of the bills K come out onto the game table 4 from a player with a total amount of the substitute currency 120 for gaming come out from the dealer 5, and being capable of determining whether or not both the amounts match each other.

The intelligent-type control device 14 has an artificial intelligence-utilizing or deep-leaning structure capable of determining whether or not a total amount of chips 9 placed in the chip tray 17 for chips for the dealer 5 of the game table 4 has been increased/decreased according to a paid amount of chips corresponding to the exchanged bills after a settlement through exchange of the bills and the chips. A case may be considered as well in which the total amount of the chips 9 placed in the chip tray 17 for substitute currency for gaming for the dealer 5 is constantly acquired in advance by using RFIDs of substitute currency 120 for gaming or the like. The intelligent-type control device 14 detects whether or not the increase or decrease in the known amount of the chip after the exchange of the bills and the chips and the clearing matches the exchange amount of the chips of the image analysis result. In addition, the intelligent-type control device 14 has an artificial intelligence-utilizing or deep-learning structure capable of determining match/mismatch of an input amount (commonly, according to key input or the like) of bills input by the dealer 5 and a calculated amount of bills that is a result of an image analysis performed by the image analyzing device 12 after the settlement through the exchange of the bills and the chips through a comparison and calculation.

Furthermore, the intelligent-type control device 14 has an artificial intelligence-utilizing or deep-learning structure capable of determining match/mismatch of a total addition amount of bills according to the input of a dealer in the game table 4 for which the dealer is responsible and a total amount of bills according to a result of an image analysis using the image analyzing device 12 through a comparison and calculation.

A system in the second embodiment relates to a system for detecting fraud in a game in a casino or an error or fraud at the time of wagering chips or doing settlement.

Among many table games played in a casino such as a casino, there are baccarat and blackjack. In such a game, a standard deck of 52 playing cards is used, the playing cards are distributed on the game table from a card distribution device including a plurality of decks (six to nine decks or ten decks) which are shuffled in advance, and win or lose is determined according to the number of distributed cards and a game rule.

The distribution of the cards from the card distribution device and the settlement of betting money to a player (game participant) are performed by a dealer or the like who is responsible for the gaming table. In a casino such as a casino, prevention of error or fraud in the settlement of the betting money for the player (game participant) is attempted.

WO 2015/107902 A discloses a card game monitoring system of reading movement of chips by using a surveillance camera and checking whether or not betting money is paid to a winner.

In a baccarat or a blackjack, there are problems in that, in the betting by a player or in the settlement for betting money to the player (game participant) by the dealer, timing of performing the betting and the settlement, who places the chips, or who takes the chips cannot be detected, and thus, whether or not these are correct cannot be recognized.

In order to solve the above-described problems, according to the second embodiment, a fraud detection system in a casino including a gaming table includes: a game monitoring device which monitors a progress of a game played on the gaming table by using a camera; an image analyzing apparatus which performs image analysis on an image obtained from the camera; a card distribution device which determines a win or lose result of each game in the game table; and a control device which specifies positions of chips placed on the gaming table by game participants by using a result of the analysis of the image analyzing apparatus in each game and determines a winner and losers among the participants of each game by using the win or lose result, and the control device further includes a function of determining at least one of: 1) whether or not there is movement of chips during the time interval from the start of extraction of cards or from the game start operation of the dealer before the win or lose result of the game is displayed by the card distribution device in each game; 2) whether or not there is movement of chips by a person other than the dealer during the time interval when the dealer collects chips wagered by the losers among the game participants after the end of each game; 3) whether or not the loser has added a chip during the time interval when the dealer collects chips wagered by the losers among the game participants after the end of each game; 4) whether or not the dealer performs payment for a position of chips wagered by the winner among the game participants after the end of each game; and 5) whether or not the winner among the game participants receives wagered chips and paid chips after the end of each game.

In addition, the control device may be configured so as to determine at least one of the aforementioned 1) to 5) by detecting movement of hands of the dealer and the game participants, movement of the chips, or the movement of hands and the movement of chips by using the result of the analysis of the image analyzing apparatus.

In addition, the control device may be configured so as to determine whether or not the amount of chips paid to the winner by the dealer is correct in accordance with the amount wagered by the winner among the game participants.

In addition, the fraud detection system of the game may be further provided with a monitor or lamp which receives the determination result and performs caution or display.

According to the fraud detection system of the embodiment, in a baccarat or a blackjack, in the betting by the player or in the settlement for betting money to the player (game participant) by the dealer, timing of performing the betting and the settlement, who places the chips, or who takes the chips can be detected, so that such an error or fraud is detected, a caution of the error or fraud is issued or the error or fraud is displayed, and the recurrence there can be prevented.

Before the embodiment is described in detail, a flow of a baccarat game played in a casino such as a casino will be described.

As described in FIG. 5, in the gaming table 4, the players (game participants) 6 take seats at the play positions 7 to face the dealer 5. The player (game participant) 6 performs wagering (hereinafter, referred to "betting") as to who of the player and the banker wins or whether the player and the banker ties as a win or lose result of the baccarat game by placing the chips 9 on the betting area 8 in front of the player's eyes. The dealer 5 counts time in order to end the betting by the players (game participants) 6 and calls "No More Bet (end of receiving the betting)" while moving the hand in the transverse direction (the state illustrated in FIG. 5). In the baccarat game, during the time interval from the time when the "No More Bet (end of receiving the betting)" is called and card extraction is started or the dealer 5 performs the game start operation before the win or lose result of the game is displayed by the card distribution device 3, the players (game participants) 6 are cannot operate chips, wager additional chips, or recover the chips which have been wagered once.

Figure 6:
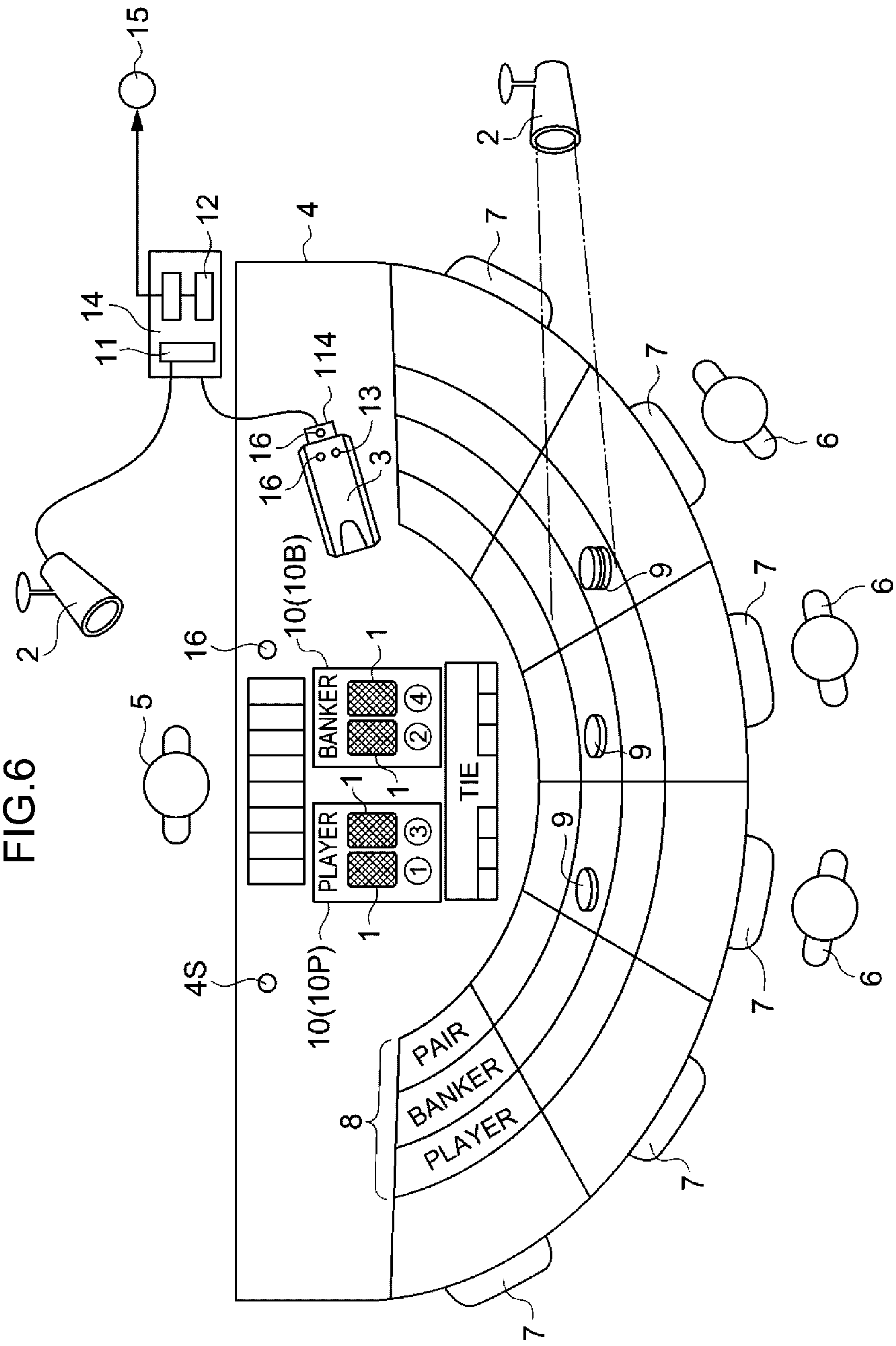
FIG. 6 is a plan view illustrating an outline of the progress state of the Baccarat game in the fraud detection system according to the embodiment of the present invention.

After that, the playing cards 1 are extracted one by one from the card distribution device 3 on the gaming table 4 in the state that the back side is faced up. First, four cards are extracted, as illustrated in (1) to (4) of FIG. 6, the first card goes to the hand of "player", the second card goes to the hand of "banker", the third card goes to the hand of "player", and the fourth card goes to the hand of "banker". These cards are arranged to be distributed to areas 10 (player area 10P and banker area 10B) on the gaming table 4 in the front side as viewed from the dealer 5. Next, according to the ranks (numbers) of the first to fourth cards 1 and the condition in the detailed rule of the baccarat game, the fifth card 1 and the sixth card 1 are extracted by the dealer 5, and these cards go to the hand of "player" or "banker". Next, according to the ranks (numbers) of the first to fourth cards 1 (in some case, the fifth and sixth cards are combined) and the detailed rule of the baccarat game, the win or lose of the game is determined. Herein, a game rule is programmed in the card distribution device 3, and the card distribution device has a structure where the win or lose of the game can be determined by reading information (ranks (numbers) or suits) of the cards 1 distributed. It is determined whether or not the win/lose determination result (win or lose result) determined by the card distribution device 3 matches with the win or lose result determined by the dealer or the like as described above.

Hereinafter, an overview of the fraud detection system for the game in the embodiment of the invention will be described. FIG. 5 is a diagram illustrating the overview of the system. The fraud detection system for the game in the casino is configured to include a game monitoring apparatus 11 which records a progress of the game played in the gaming table 4 including a player (game participant) 6 and the dealer 5 as an image through cameras 2, an image analyzing apparatus 12 which performs image analysis on the recorded image of the progress of the game, and a card distribution device 3 which has a function of determining a win or lose result of each game in the gaming table 4 and displaying the win or lose result. The card distribution device 3 is a so-called electronic shoe used by the skilled in the art and has a structure where a game rule is programmed in advance, the timing that the cards 1 are distributed by the dealer 5 at the initial time of each game is sensed, and the win or lose of the game can be determined by reading information (rank (number) or suit) of each card 1 distributed. For example, in a baccarat game, banker win, player win, or tie is basically determined by a rank of two or three cards, and a determination result (win or lose result) is displayed by a display lamp 13.

The control device 14 of the detection system has a chip detecting function of specifying which of the betting areas 8 of the player side and the banker side on the gaming table 4 the players 6 (game participants) wager the chips 9 on by using the result of the analysis of the image analyzing apparatus 12 in each game. It is assumed that, when the chips 9 are overlapped in a deviated manner or are in a blind spot from the position of the camera 2, the position and total amount of the chips 9 (which of the betting areas 8 of the player side and the banker side the chips 9 are wagered on) cannot be read normally. The control device 14 is configured to be capable of recognizing concealing or the like (including concealing of a portion of one chip and concealing of the entire chip) of the chip 9 caused by the blind spot, so that the number of chips or the like can be accurately recognized by using a self-learning function or the like according to an existing artificial intelligence utilizing type computer or control system and deep learning (structure) technique. In addition, the structure of detecting the position and type of the chip 9 in the betting area 8 is not limited thereto, but for example, the structure may be configured so that the position and the type can be detected by reading the ID buried in the chip.

As described heretofore, the control device 14 can recognize, through the camera 2 and the image analyzing apparatus 12, the position 8 (position of player, banker, or pair wagered) on which each player 6 wagers the chips 9 and the type (different amount values are designated to different colors of the chips 9) and number of the chips 9, and the control device can detect who is the player 6 betting on the "player" (in the case where there are a plurality of the players 6 betting on the "player", who is the player 6 wagering the highest amount) and who is the player 6 betting on the "banker" (in the case where there are a plurality of the players 6 betting on the "banker", who is the player 6 wagering the highest amount). In this detection system, each of the image analyzing apparatus 12 and the control device 14 has a structure including a computer configured with an integrated or plural components, a program, and a memory in a complex manner.

The control device 14 has a structure capable of determining match or mismatch by checking information on rank and suit obtained from the image (captured by using the camera 2) of each card 1 distributed in the gaming table 4 by the image analyzing apparatus 12 and information on rank and suit read by the card distribution device 3. The control device 14 determines by image analysis of a progress of the game through the image analyzing apparatus 12 according to the win or lose result of the game determined by the card distribution device 3 for each game whether or not the collection of the lost chips 9 wagered by the players (game participants) 6 and the redemption of the winning chips to the winning player (game participant) 6 are correctly performed in accordance with the win or lose result.

Figure 7:
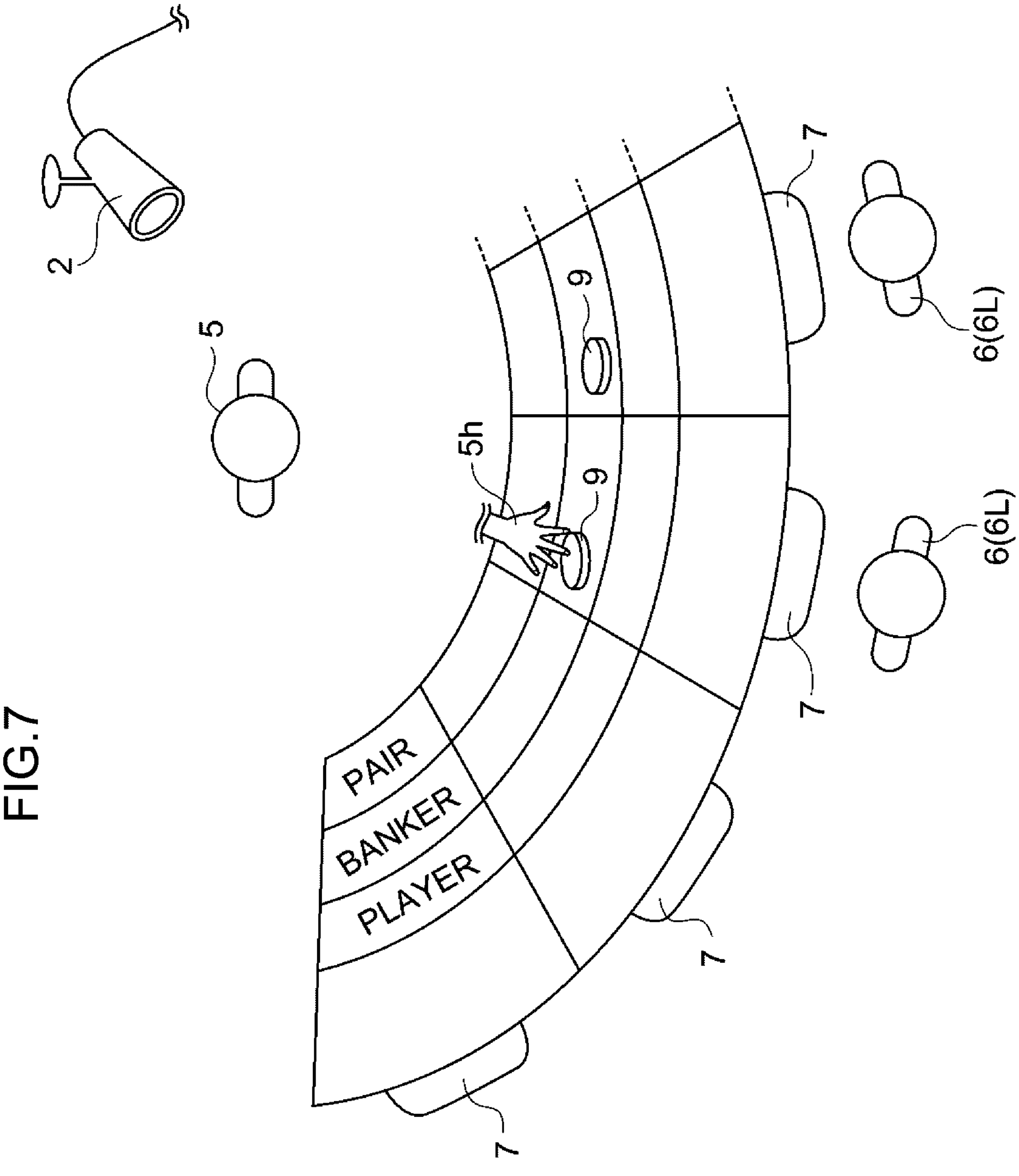
FIG. 7 is an explanatory view illustrating a state of collecting chips won by a casino side by a dealer in a Baccarat game.

As remarkable functions of the embodiment, the control device 14 has functions described in the following 1) to 5) according to the rule of the baccarat game and determines whether or not fraud in discordance with the rule is performed. Namely, the functions are as follows:

1) Whether or not there is movement of the chips 9 is surveilled by the information obtained the image analyzing apparatus 12 using the camera 2 during the time interval from the signal starting the card extraction obtained from the card distribution device 3 or from the game start operation of the dealer 5 pushing a start button 4*s* before the win or lose result of the game is displayed by the card distribution device 3 in each game (illustrated in FIG. 6).
2) Whether or not the loser 6 takes the chips 9 fraudulently is surveilled by the information obtained the image analyzing apparatus 12 using the camera 2 during the time interval when the dealer 5 collects the chips 9 wagered by the loser among the game participants 6 after the end of each game (illustrated in FIG. 7).
3) Whether or not a person (winner or loser) other than the dealer 5 adds the winning chips 9W or newly places the chips 9 on the winning side which the person did not wager chips on is surveilled by the information obtained the image analyzing apparatus 12 using the camera 2 during the time interval when the dealer 5 collects the chips 9 wagered by the loser among the game participants 6 after the end of each game.
4) Whether or not the dealer 5 correctly places the paid chips 9W on the position of the chips 9 wagered by the winner 6W among the game participants 6 (illustrated in FIG. 8) is surveilled by the information obtained the image analyzing apparatus 12 using the camera 2 after the end of each game.
5) Whether or not the winner 6W among the game participants 6 takes the wagered chips 9 and the paid chips 9W (illustrated in FIG. 9) is surveilled by the information obtained the image analyzing apparatus 12 using the camera 2 after the end of each game (the dealer 5 manipulates the card distribution device 3 to allow the display lamp 13 to display the win or lose result).

Figure 10A:
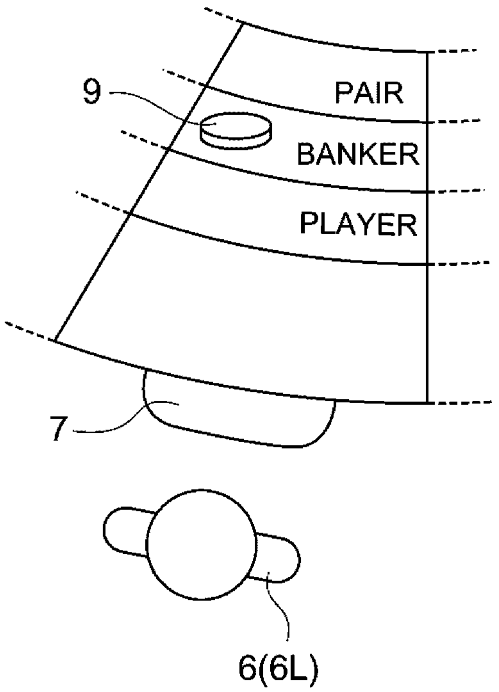
FIG. 10A is an explanatory view of an image to be subjected to image analysis of collection of chips won by a dealer in a fraud detection system according to the embodiment of the present invention.
Figure 10B:
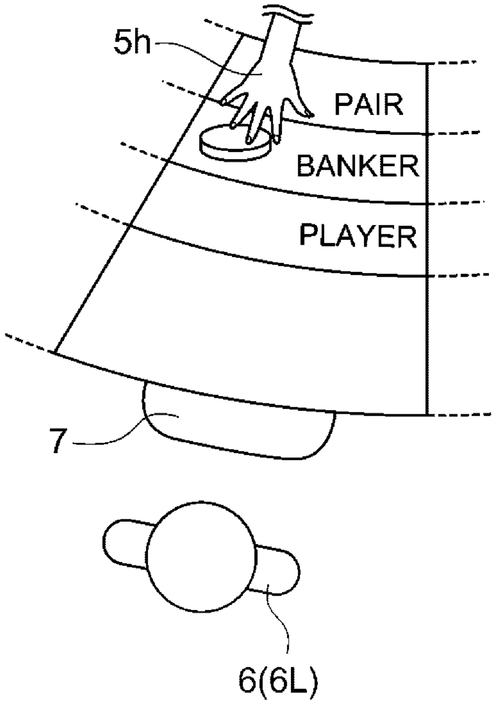
FIG. 10B is an explanatory view of an image to be subjected to image analysis of collection of chips won by a dealer in a fraud detection system according to the embodiment of the present invention.
Figure 10C:
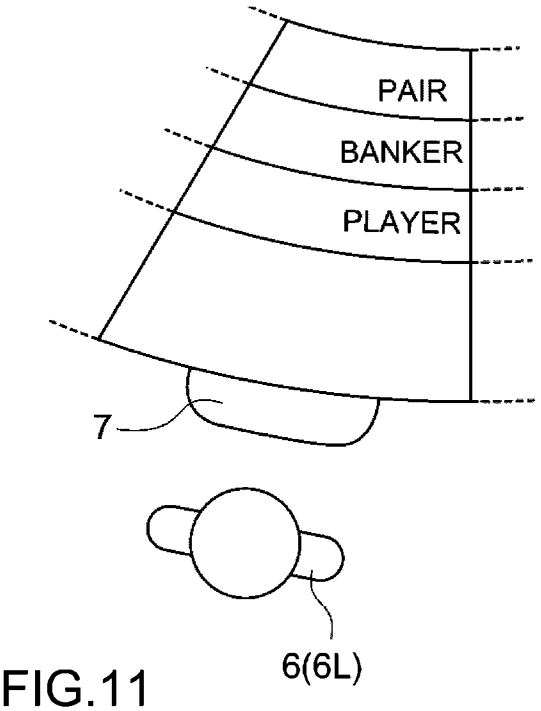
FIG. 10C is an explanatory view of an image as an object of image analysis of collection of chips won by a dealer in a fraud detection system according to the embodiment of the present invention.

The control device 14 performs analysis of the information obtained by using the camera 2 by the image analyzing apparatus 12. Namely, although the above-described surveillance of from 1) to 5) is performed by detecting the movement of the hands of the dealer 5 and the game participant 6, the movement of the chips, or the movement of the hands and the movement of the chips by the using the analysis result of the image analyzing apparatus 12, in a fundamental analysis, it needs to be found at least who the chips 9 is taken to. Hereinafter, a method of the analysis will be described with reference to FIGS. 10 to 12.

The chips 9 wagered by the game participant 6L losing the game are collected by the dealer 5. Whether or not the collection is accurately performed is surveilled by analyzing the information obtained by using the camera 2 in the image analyzing apparatus 12. First, a change from the state (FIG. 10A) that the betting chips 9 exist to the state (FIG. 10C) that the chips do not exist is detected by the image analysis. Next, an image (FIG. 10B) between the state that the chips 9 exist and the state that the chips do not exist is analyzed. In the image (FIG. 10B) between the state that the chips 9 exist and the state that the chips do not exist, which side the hand 5*h* reaches from (from the top side of FIG. 12 or the others) is analyzed. Fraud is detected in accordance with a rule, that is, in the case where the hand reaches from the top side (the hand movement, that is, the hand appears from the top side or the hand leaves toward the top side), the hand 5*h* is determined as the hand of the dealer 5, and in the case where the hand reaches from the other directions, the hand movement is determined as fraud.

Figure 11:
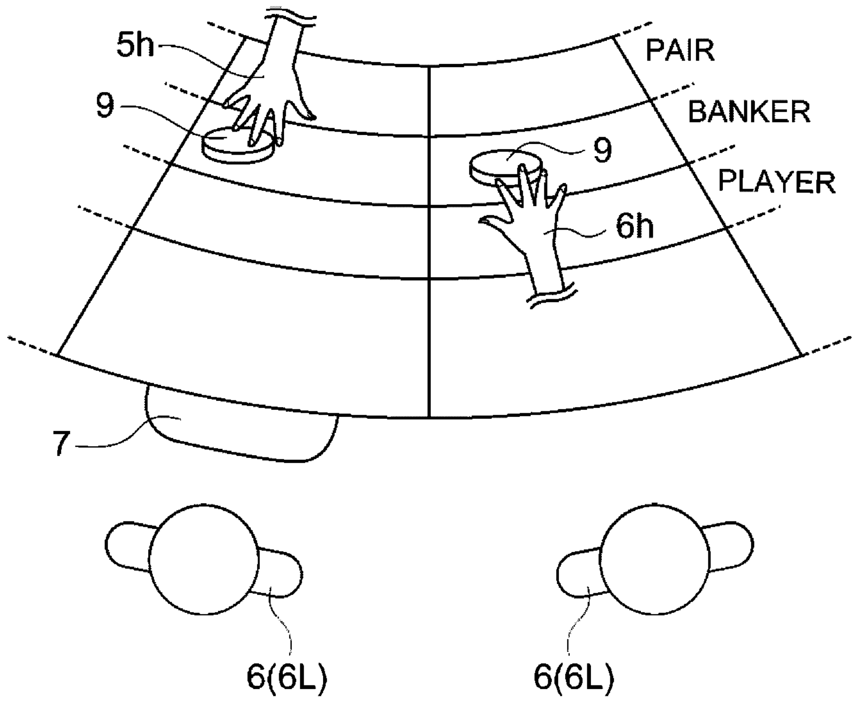
FIG. 11 is an explanatory view of an image to be subjected to image analysis of illegal collection of chips in the fraud detection system.

While the dealer 5 collects the chips 9 wagered by the game participant 6L losing the game, it is surveilled whether or not another person takes the lost chips 9 fraudulently (FIGS. 10 and 11). In the image between the state that the chips 9 exist and the state that the chips do not exist, as illustrated in FIG. 11, through analyzing the movement of the loser 6L and the like among the game participants 6, it is detected by the image analysis that the hand 6*h* reaches or moves from the bottom side of FIG. 11 (actually, from the top side), and the movement is determined that the hand 6*h* or the like other than the hand of the dealer 5 takes the chips 9, so that it is determined that fraud occurs.

Figure 12A:
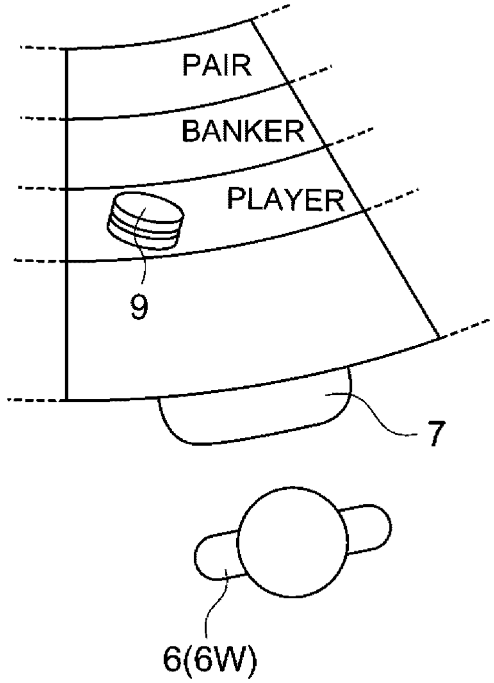
FIG. 12A is an explanatory view of images to be subjected to image analysis of collection of chips won by a game participant side in the fraud detection system.
Figure 12B:
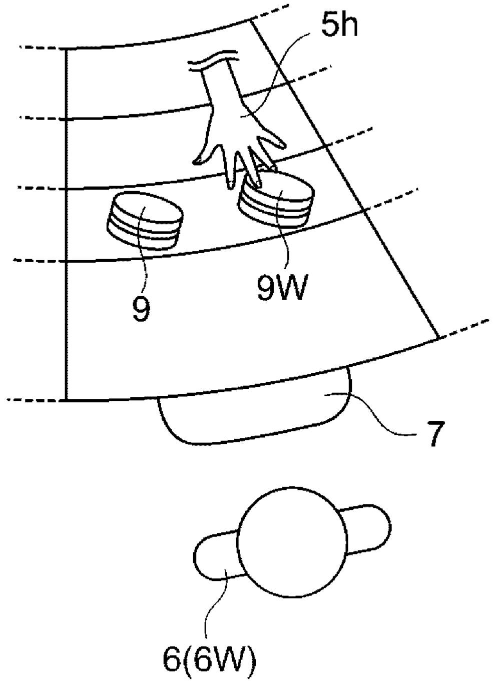
FIG. 12B is an explanatory view of an image to be subjected to image analysis of collection of chips won by a game participant side in the fraud detection system.
Figure 12C:
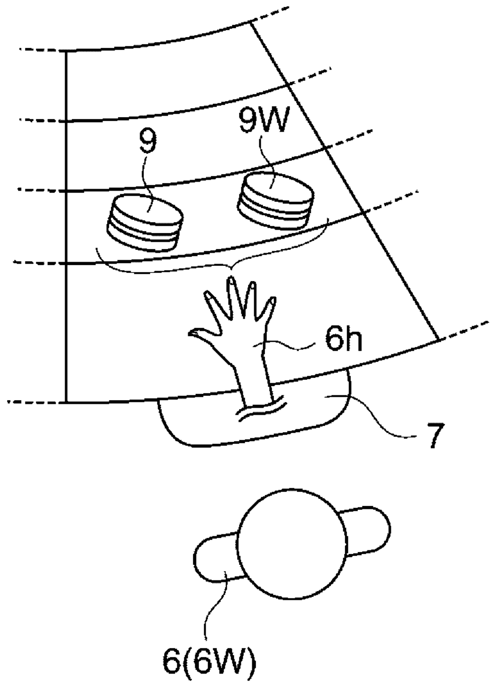
FIG. 12C is an explanatory view of an image to be subjected to image analysis of collection of chips won by a game participant side in the fraud detection system.
Figure 12D:
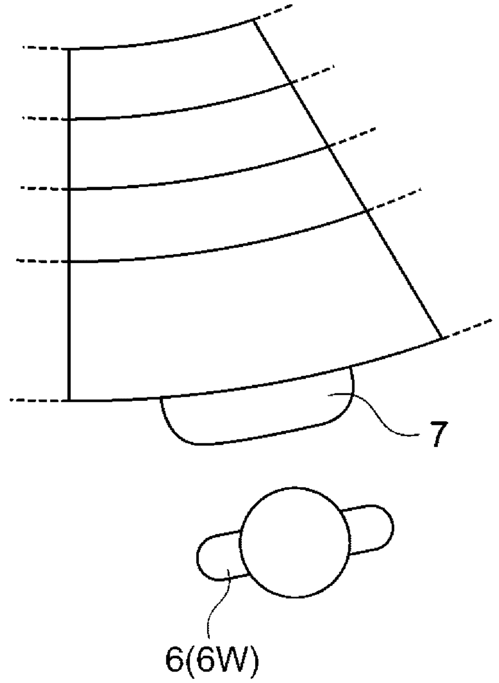
FIG. 12D is an explanatory view of images to be subjected to image analysis of collection of chips won by a game participant side in the fraud detection system.
Figure 13:
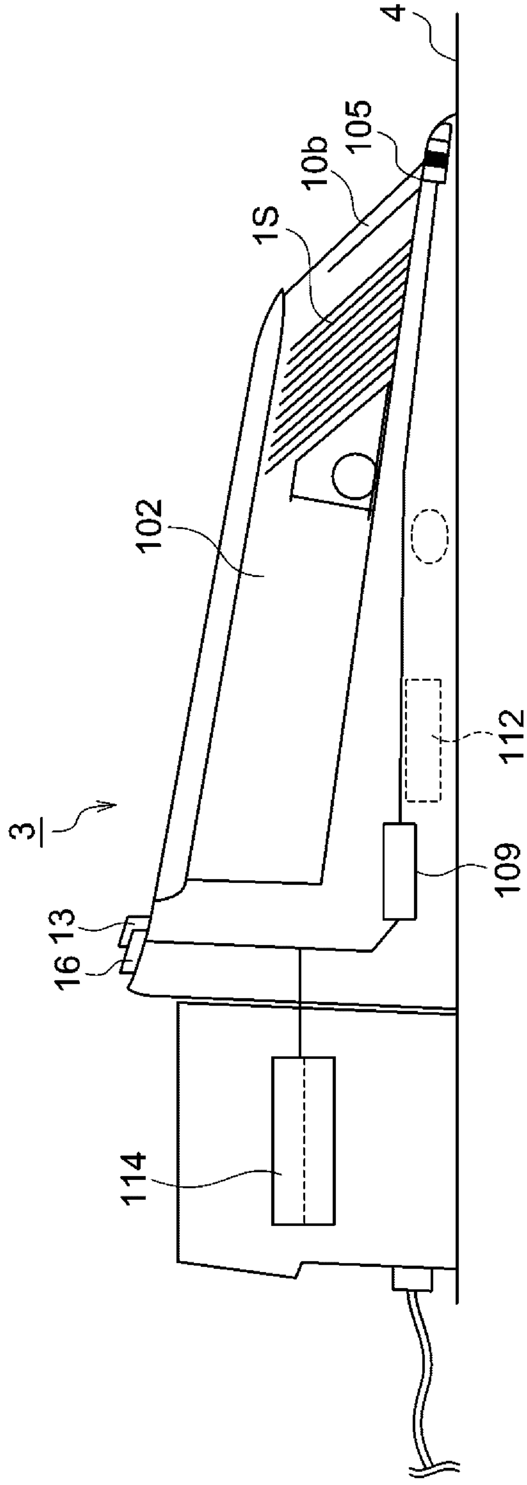
FIG. 13 is a side cross-sectional view of a card distribution device according to the embodiment of the present invention.
Figure 14:
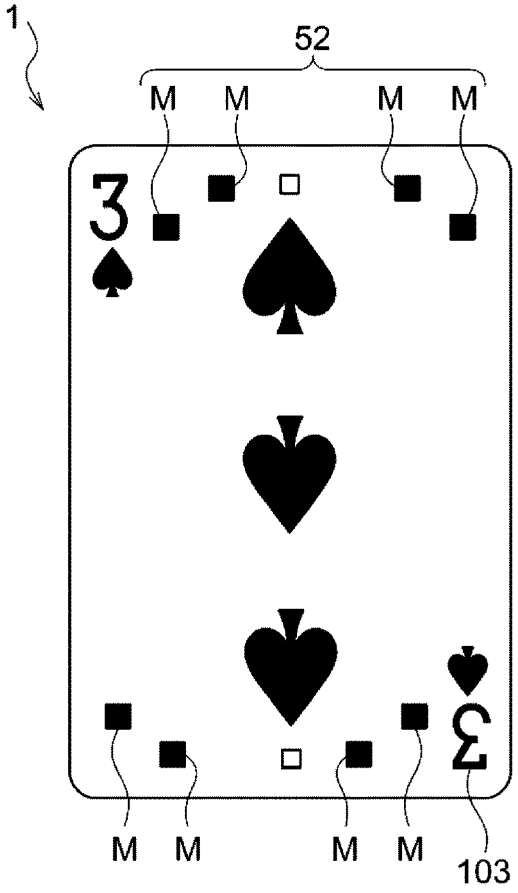
FIG. 14 is a diagram illustrating an example of a card according to an embodiment of the present invention.

First, with respect to the winning chips illustrated in FIG. 12A, the chips 9W are redeemed in accordance with the game rule as illustrated in FIG. 12B. A change from the state illustrated in FIG. 12A to the state illustrated in FIG. 12B is detected, and at the same time, whether or not the hand is the hand 5*h* of the dealer 5 is detected by the image analysis. After that, as illustrated in FIG. 12C, now, whether or not the hand 6*h* of the winner 6W among the game participants 6 reaches (moves) the same betting area and, after that, all the chips 9 do not exist (state of FIG. 12D) is verified from the image analysis result in accordance with the game rule by the control device 14, so that it is determined whether or not fraud occurs.

In addition, the control device 14 is configured to determine whether or not the amount of chips redeemed to the winner by the dealer 5 is correct according to the amount wagered by the winner 6W among the game participants 6. Hereinafter, a specific example thereof is described. It is assumed that, when the chips 9 are overlapped in a deviated manner or are in a blind spot from the position of the camera 2, the position and total amount of the chips 9 (which of the betting areas 8 of the player side and the banker side the chips 9 are wagered on) cannot be read normally. The control device 14 is configured to be capable of recognizing concealing or the like (including concealing of a portion of one chip and concealing of the entire chip) of the chip 9 caused by the blind spot, so that the number of chips or the like can be accurately recognized by using a self-learning function or the like according to an existing artificial intelligence utilizing type computer or control system and deep learning (structure) technique. In addition, the structure of detecting the position and type of the chip 9 in the betting area 8 is not limited thereto, but for example, the structure may be configured so that the position and the type can be detected by reading the ID buried in the chip.

As described heretofore, the control device 14 can recognize, through the camera 2 and the image analyzing apparatus 12, the position 8 (position of player, banker, or pair wagered) on which each player 6 wagers the chips 9 and the type (different amount values are designated to different colors of the chips 9) and the number of the chips, and the control device can detect who is the player 6 betting on the "player" (in the case where there are a plurality of the players 6 betting on the "player", who is the player 6 wagering the highest amount) and who is the player 6 betting on the "banker" (in the case where there are a plurality of the players 6 betting on the "banker", who is the player 6 wagering the highest amount).

In addition, the control device 14 of the fraud detection system in the game analyze the information obtained by the image analyzing apparatus 12 using the camera 2 by the above-described method in accordance with the rule of the baccarat game and performs surveillance. By performing the surveillance illustrated in the above-described 1) to 5), it is determined whether or not fraud in discordance with the rule is performed. When fraud is detected, abnormality display lamps 16 provided to both of the card distribution device 3 and the gaming table 4 turns on and the fraud detection outputs 15 to a casino management department or the like in a wireless or wired manner. A monitor or a lamp which receives the determination result to perform caution or display may be further provided to another site.

As described heretofore, the fraud is detected by the control device 14, and, at the detecting time or a proper timing, a display signal is output to the display lamp 13 of the card distribution device 3 or the abnormality display lamp 16. However, besides the performing of caution, after the time when the fraud or error is detected, a card distribution preventing function of the card distribution device 3 may be performed to prevent the distribution of the cards 1.

Hereinafter, an embodiment of the card distribution device 3 used in a table game system according to the invention will be described with reference to FIGS. 13 to 17. The card distribution device 3 is configured to include a card containing portion 102 which contains a plurality of shuffle playing cards 1*s*, a card guiding portion 105 which guides the shuffle playing card 1 when the dealer 5 or the like manually extracts the shuffle playing card 1 one by one from the card containing portion 102 toward the gaming table 4, an opening portion 106 for taking the card 1 guided from the card guiding portion 105, a card detecting unit (card detecting sensors 22 and 23) which detects that the shuffle playing card 1 is extracted when the shuffle playing card 1 is extracted, a card reading unit 108 which reads information representing at least the number (rank) of the shuffle playing card 1, a control unit 109 which determines the win or lose of the card game based on the numbers (ranks) of the shuffle playing cards 1 sequentially read by the card reading unit 108, a result display lamp 13 which displays the win or lose result determined by the control unit 109, a distribution restricting device 30 which is provided to the opening portion 106 and restricts entering and exiting of the card 1 from the card containing portion 102, and a management control unit 114 having functions equivalent to the control device 14, and these components are integrated. The card distribution device has a function where, in the case where error or fraud of the dealer in the game is detected by the control device 14, the further extraction of the card from the card distribution device 3 is stopped after the time of the detection or at a predetermined timing.

Figure 15:
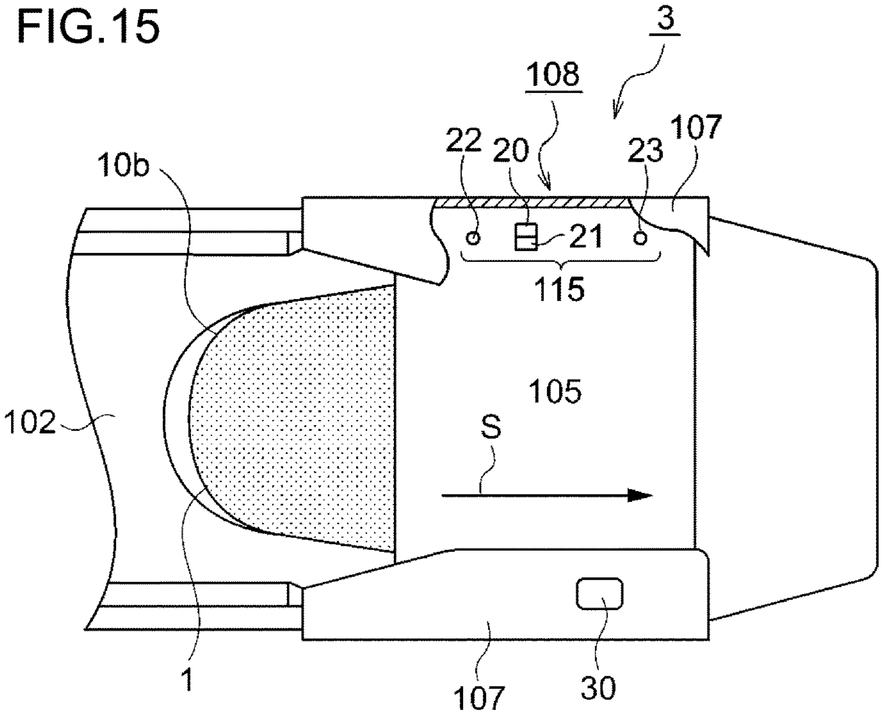
FIG. 15 is a plan view of a main part in a state where the card guide portion of the card distribution device according to the embodiment of the present invention is partially broken.
Figure 16A:
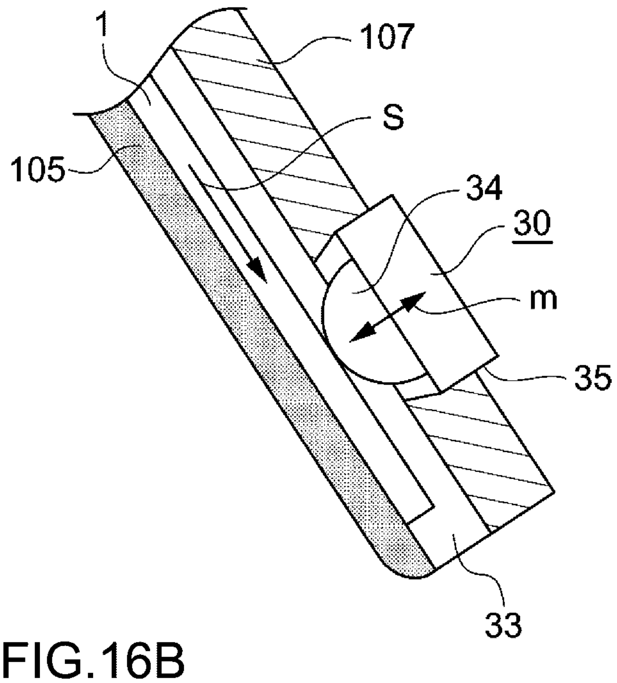
FIG. 16A is a cross-sectional side view of a principal part illustrating a distribution limiting device for restricting the entry and exit of a card from a card housing portion of a card distributing device according to the embodiment of the present invention.

Next, the distribution restricting device 30 which restricts the entering and exiting of the cards 1 from the card containing portion 102 will be described with reference to FIGS. 15 and 16. The distribution restricting device 30 is provided to a card guide 107 of the card guiding portion 105 which guides the card 1 extracted one by one from the opening portion 106 in the front side of the card containing portion 102 onto the gaming table 4. The distribution restricting device 30 has a structure where, when the card 1 passes through a slot 33 between the card guiding portion 105 and the guide cover of the card guide 107, a lock member 34 presses the card 1 to prevent the entering and exiting of the card 1 in the slot 33. The lock member 34 is moved by a driving unit 35 such as an electronic solenoid or a piezoelectric device as illustrated by an arrow m so as to take two states of a position (limiting position) of pressing the card 1 and a pass enabling position of enabling the card 1 to pass. The driving unit 35 is controlled by a control unit 109 which is directly or indirectly connected to the control device 14 in a wired or wireless manner to move the lock member 34 to the two states of the position of pressing the card 1 and the pass enabling position of enabling the card 1 to pass. The rule of the baccarat game is programed and stored in advance in the control unit 109.

Figure 16B:
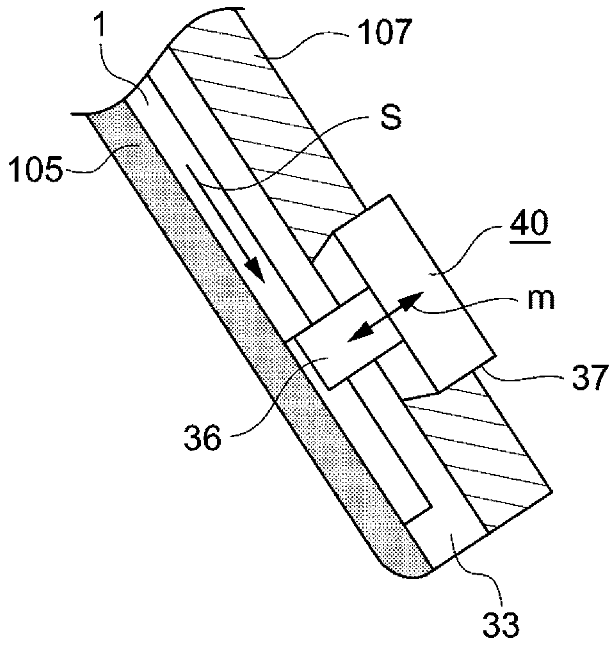
FIG. 16B is a cross-sectional side view of a principal part illustrating a modified example of a distribution restricting device for restricting the entry and exit of a card from a card storing portion of a card distributing device according to the embodiment of the present invention.

Next, a modified example of the distribution restricting device 30 will be described with reference to FIG. 16B. In the modified example, the distribution restricting device 40 has a structure where, when the card 1 passes through the slot 33 between the card guiding portion 105 and the card guide 107 (guide cover), the lock member 36 projects into the slot 33 to prevent the movement of the card 1. The lock member 36 is moved by a driving unit 37 such as an electronic solenoid or a piezoelectric device as illustrated by an arrow m so as to take two states of a position (limiting position) of preventing the movement of the card 1 and a pass enabling position of enabling the card 1 to pass. The driving unit 37 is controlled by the control unit 109 which is connected to the control device 14 to move the lock member 36 to the two states of the position of preventing the movement of the card 1 and the pass enabling position of enabling the card 1 to pass.

Next, details of the code reading unit 108 which reads a code 52 representing a digit (number, rank) of the card 1 from the card 1 when the card 1 is manually extracted from the card containing portion 102 will be described. FIG. 15 is a plan diagram illustrating main components of the card distribution device 3. In the figure, the code reading unit 108 is provided to the card guiding portion 105 which guides the card 1 manually extracted one by one from the opening portion 106 in the front side of the card containing portion 102 onto the gaming table 4. The card guiding portion 105 is formed to have a slanted surface, and the card guides 107 functioning as a sensor cover are provided to two edges of the card guiding portion. In addition, each of the two card guides 107 is formed detachable by using a screw or the like (not shown). If the card guides 107 are detached, sensor groups 115 of the code reading unit 108 are exposed. The sensor group 115 is configured with four sensors including two UV-ray sensitive sensors (UV sensors) 20 and 21 and object detection sensors 22 and 23.

The object detection sensors 22 and 23 are optical-fiber type sensors of detecting the existence of the card 1 and can detect the movement of the card 1. One object detection sensor 22 is located at the upstream side of the card guiding portion 105 in the card 1 flowing direction, and the other object detection sensor 23 is located at the downstream side. As illustrated in the figure, the two object detection sensors 22 and 23 are provided at the respective upstream and downstream sides to interpose the UV sensors 20 and 21. The UV sensors 20 and 21 have LEDs (UV LEDs) emitting a UV ray and sensors. A mark M of the code 52 is printed on the card 1 by using UV ray emitting ink which exhibits color if the ink is hit by the UV ray. By irradiating the card 1 with the UV ray (black light), reflected light of the mark M of the code 52 of the card 1 is sensed by the sensor. The UV sensors 20 and 21 are connected to the code reading unit 108 and the control unit 109 through cables. In the code reading unit 108, a combination of the marks M is determined and the number (rank) corresponding to each code 52 is determined from the output signal of the sensors, that is, the UV sensors 20 and 21.

Figure 19:
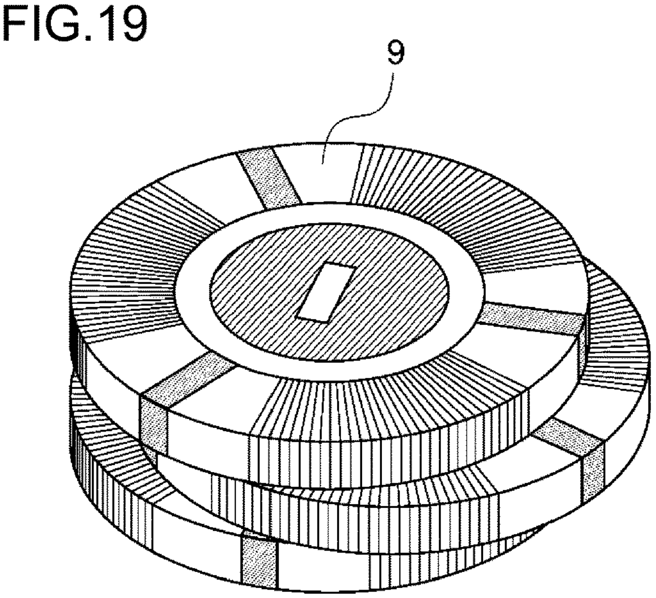
FIG. 19 is a perspective view of a conventional gaming substitute currency.

In the code reading unit 108, starting and ending of the UV sensors 20 and 21 are controlled by the control unit 109 based on the detection signals of the object detection sensors 22 and 23. In addition, the control unit 109 determines based on the detection signals of the object detection sensors 22 and 23 whether or not the card 1 passes through the card guiding portion 105 normally. As illustrated in FIG. 19, two rows and four columns of the rectangular marks M representing the rank (number) and suit (heart, spade, or the like) of the card are arranged in the edge of the card 1. If the UV sensors 20 and 21 sense the mark M, the sensors output "on" signals. The code reading unit 108 determines a relative relationship between the two signals input from the two UV sensors 20 and 21. Therefore, the code reading unit 108 specifies the code according to a relative difference between the two marks M sensed by the two UV sensors 20 and 21 to specify the number (rank) and type (suit) of the corresponding card 1.

Figure 17:
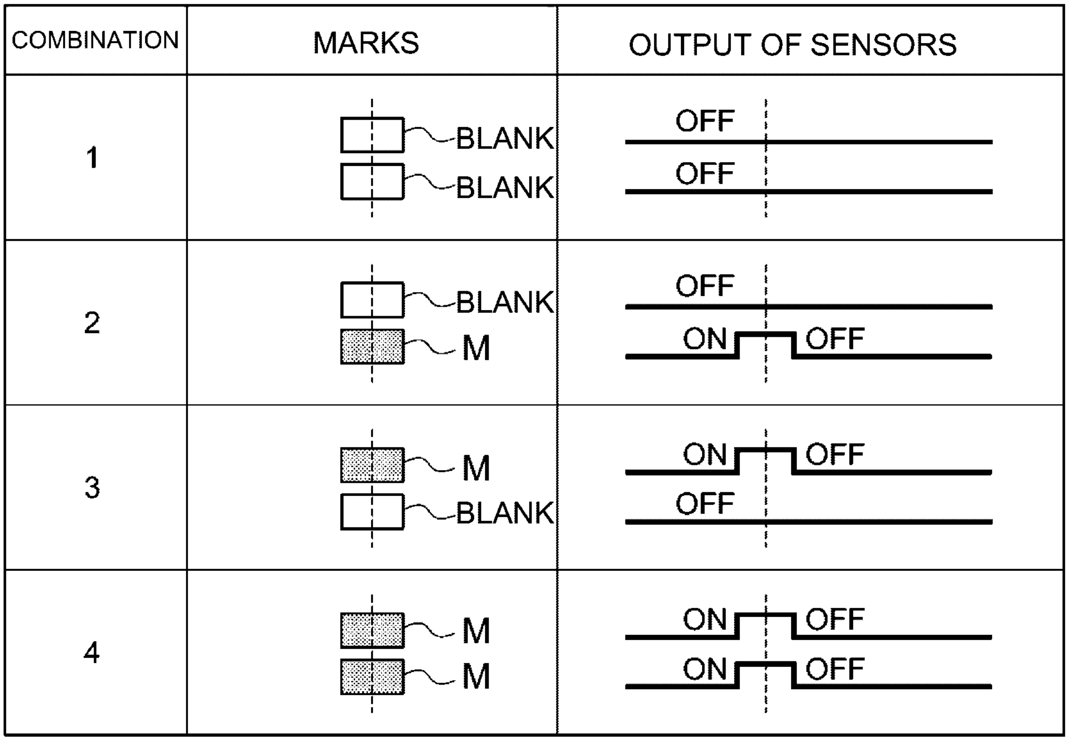
FIG. 17 is a diagram illustrating a relationship between output waveforms of sensors and marks in a card distribution apparatus according to the embodiment of the present invention.

The relationship between the code 52 and the outputs of the "on" signals of the two UV sensors 20 and 21 is illustrated in FIG. 17. Based on the result of comparison of the relative change of the outputs of the "on" signals of the UV sensors 20 and 21, a predetermined combination of the marks M can be specified. As a result, four combinations of the marks M of the up and down two columns are obtained, and if the four combinations are printed in four columns, 4 to the 4th power, that is, 256 types of codes can be configured. By assigning 52 types of cards of the trump cards to 256 types of the codes, details of the assignment is stored as a comparison table in a memory or as a program, and the code reading unit 108 is configured so that, by specifying each code 52, the number (rank) and type (suit) of the card 1 is specified from a pre-defined comparison table (not shown). In addition, since the 256 types of the codes are stored in the comparison table in a manner that the codes are freely combined to be in association with the 52 types of the cards, the combinations may be complicated, and thus, the combinations of the 256 types of the codes and the 52 types of the card can be changed according to time and location. It is preferable that the code is printed by using a paint which is visualized by being irradiated with UV light and the code is printed at a position where the codes do not overlap a type indicator or index 103 of the card.

Heretofore, although various embodiments of the invention are described, the above-described embodiments can be modified within the scope of the invention by the skilled in the art, and if needed in a game to which the embodiment is applied, the apparatus according to the embodiment may be appropriately modified.

A management system according to a third embodiment relates to a management system of table games in a game house.

In a game house such as a casino, there are various attempts preventing dealer's mistakes in handling substitute currency for gaming (chip). A game house includes monitoring cameras used for monitoring dealer's mistakes in handling chips, and such mistakes are prevented using a determination of mistakes and fraud according to collection and repayment of substitute currency for gaming that are different from a result of winning/losing based on images acquired using the monitoring cameras and the like.

Meanwhile, in order to acquire the quantity and a total amount of substitute currency for gaming, it has been proposed to acquire the amount of the substitute currency for gaming by attaching an IC tag to each substitute currency for gaming.

In a card game monitoring system disclosed in PCT Application Publication No. PCT/JP2015/000171, it is determined whether or not substitute currency for gaming place on a game table is collected or repaid according to a result of winning/losing by performing an image analysis of movement of the substitute currency for gaming, and monitoring of dealer's mistakes in handling the chips is performed.

In game houses such as casinos, while substitute currency for gaming is piled to have a high volume and is placed on a game table, there is a problem in that a total amount cannot be correctly read by a reading device for IC tags disposed under the game table, and, when the sensitivity of the reading device is increased, substitute currency or gaming placed at a different position (winning/losing depends on the position) is added, and there is a problem in that a total amount of substitute currency for gaming at each position cannot be perceived. In addition, conventionally, as illustrated in FIG. 19, the pattern of substitute currency for gaming (chip) T is complicated, and, when a plurality of chips are piled, there is a problem in that the quantity of such a pile cannot be accurately acquired using a camera.

Furthermore, fraud on a game table has been advanced, and there is a new problem in that fraud using an advanced betting method or the like that cannot be found in simple detection of a large winning amount on a game table or the like cannot be found by using a camera.

In addition, it is necessary for a dealer to collect or re-paid substitute currency for gaming placed on a game table according to a result of winning/losing. In a case this is to be determined by performing an image analysis of the chip, since the pattern of the substitute currency for gaming (chip) is complicated, there is a problem in that it cannot be determined whether or not a dealer correctly performs re-payment when chip corresponding to the bet chip is repaid by using a currently-existing practical image analyzing technology, and the prevention of mistakes is not sufficient.

In order to solve the various problems described above, a management system of table games according to this embodiment includes: a card distributing device that determines and displays a result of winning/losing of each game in a game table; a measurement device that measures the types and the quantities of substitute currency for gaming place on the game table by using a camera; and a management control device that specifies and stores the position, the types, and the quantity of substitute currency for gaming placed on the game table by a game participant by using a result of the measurement performed by the measurement device in each game. The substitute currency for gaming has a configuration in which a plurality of plastic layers of different colors are stacked, at least a coloring layer is included in the middle, and a stripe pattern in a stacking direction is formed on a side face by employing a multi-layer structure in which white layers or thin-color layers are stacked on both sides of the coloring layer disposed in the middle, and the type of the substitute currency for gaming can be specified by using the coloring layer. The management control device has calculation functions of determining a winner and a loser among participants in each game by using a result of winning/losing acquired from the card distributing device and a result of the measurement of the position, the types, and the quantities of the substitute currency for gaming placed by each game participant and calculating the balance of the casino side in the game table for each game.

In addition, in the management system, the management control device has a structure including a function of determining the quantity of the substitute currency for gaming by measuring the number of coloring layers, the white layers, or the thin-color layers of the substitute currency for gaming placed by each game participant.

In order to solve the various problems, substitute currency for gaming according to this embodiment has a configuration in which a plurality of plastic layers of different colors are stacked, at least a coloring layer is included in the middle, and a stripe pattern in a stacking direction is formed on a side face by stacking white layers or thin-color layers on both sides of the coloring layer, and the type of the substitute currency for gaming can be specified by using the coloring layer.

In addition, in the substitute currency for gaming, on the surface of the white layer or the thin-color layer, a print representing the type of the substitute currency for gaming is formed, transparent layers are disposed in outermost layers, and each interlayer is thermos-compressed to form a structure of at least five layers.

In addition, in the substitute currency for gaming, marks using UV ink or carbon black ink are arranged on the surfaces of the white-color layers or the thin-color layers, or embossing processing is performed for the transparent layer of the outermost layer, or R processing is performed for the ends of the transparent layers of the outermost layers, or the coloring layer is formed by a plurality of layers, and RFIDs may be built in the coloring layers.

In order to solve the various problems described above, an inspection device inspecting substitute currency for gaming according to this embodiment includes: a passage including an inlet and an output through which the substitute currency for gaming can pass in a radial direction; a chip type determining device that determines a color of the stripe in the staking direction of the side face by imaging the side face of the substitute currency for gaming passing through the passage; a mark reading device that reads a mark, which is formed using the UV ink or the carbon black ink, arranged on the surface of the passing substitute currency for gaming; a print inspecting device that reads a print representing the type arranged on the surface of the substitute currency for gaming in a vertical direction with respect to the passage; and a control device of the whole device. The control device is configured to inspect whether or not the type of the substitute currency for gaming determined by the chip type determining device matches a content of the print representing the type acquired by the print inspecting device.

According to the system of this embodiment, even in a case where many substitute currencies for gaming (chip) are piled up, the quantity of the chips can be determined, and a total amount of relatively overlapping substitute currency for gaming can be acquired based on the position and the color.

Figure 18:
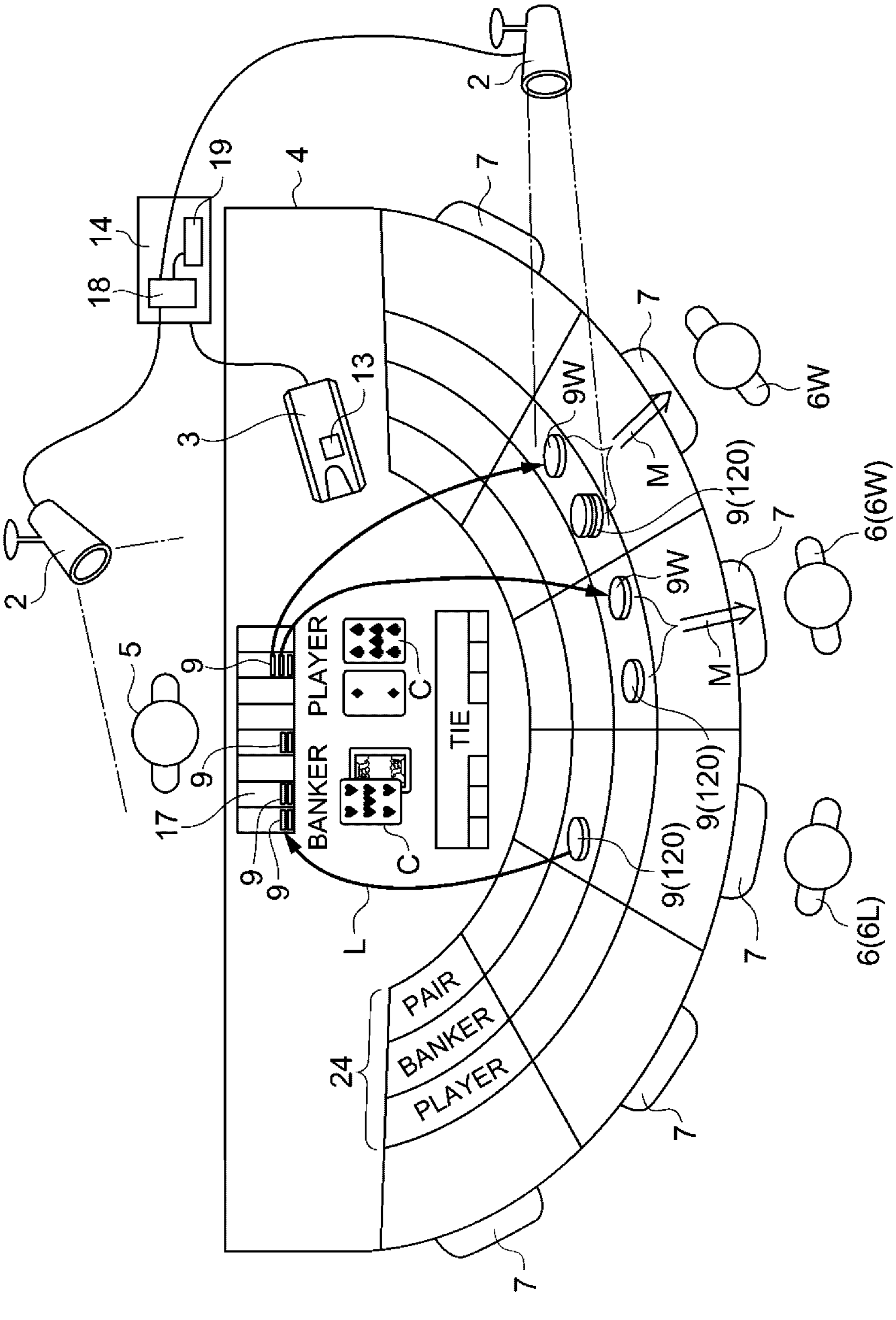
FIG. 18 is a plan view illustrating the outline of the entire table game management system of a game arcade in the embodiment of the present invention.

Hereinafter, a management system of table games in a game house including a game table according to an embodiment of the present invention will be described. FIG. 18 is a diagram that illustrates an overview of the whole system. The management system of table games in a game house including a plurality of game tables 4 includes: a measurement device 19 including an image analyzing device 18 that records a state of process of a game played in the game table 4 as a video including game participants 6 and a dealer 5 through a plurality of cameras 2 and performs an image analysis of the recorded video of the state of process of the game; and a card distributing device 3 that determines and displays a result of winning/losing of each game in the game table 4. The card distributing device 3 is a so-called electronic shooter that has already been used by persons skilled in the art and has rules of a game programmed in advance and has a structure capable of determining winning/losing of a game by reading information of distributed cards C. For example, in a Baccarat game, winning of the baker, winning of a player, or tie (drawn) is determined basically based on the ranks of two to three cards, and a determination result (a result of winning/losing) is displayed in a result display lamp 13.

The management control device 14 reads information (ranks and suits) of cards C acquired from the card distributing device 3 and determines a result of winning/losing of each game and determines a winner 6W and a loser 6L among the participants 6 in each game by using a result of measurement of the position, the types, and the quantities of substitute currency 120 (chips 9) for gaming placed by the game participants 6. In addition, the management control device 14 has a calculation function of calculating a balance (an amount acquired by subtracting a total amount of substitute currency 120 (chips 9) for gaming that is re-paid to a winner 6W among the participants 6 from a total amount of substitute currency 120 (chips 9) for gaming bet by the loser 6L) of the casino side in the game table 1 for each game.

The image analyzing device 18, the measurement device 19, and the management control device 14 of this detection system have a structure integrally including a computer formed as one body or by a plurality of configurations, a program, and a memory.

Figure 8:
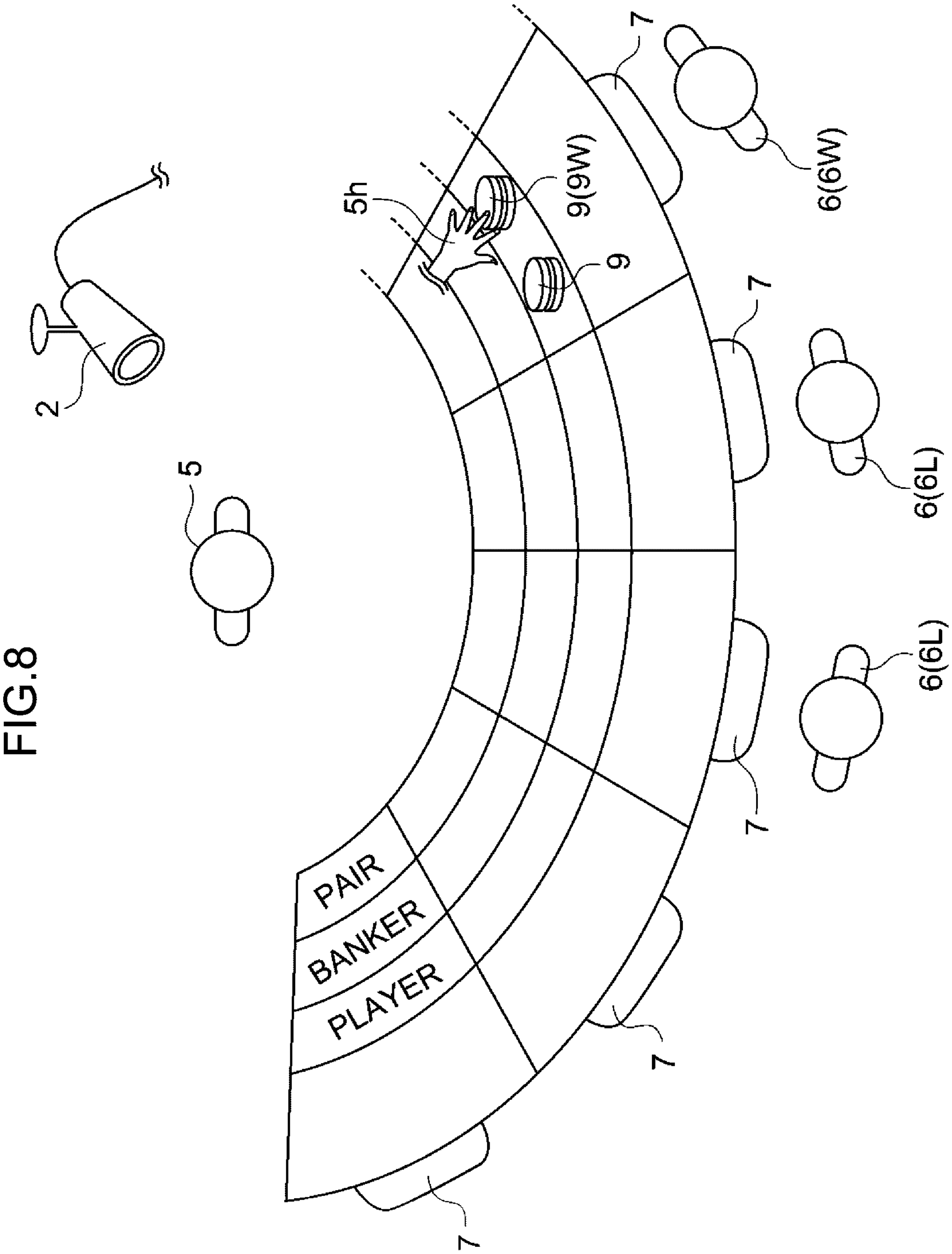
FIG. 8 is an explanatory view illustrating a state of payment to a winning customer (game participant) by a dealer in a Baccarat game according to the embodiment of the present invention.
Figure 9:
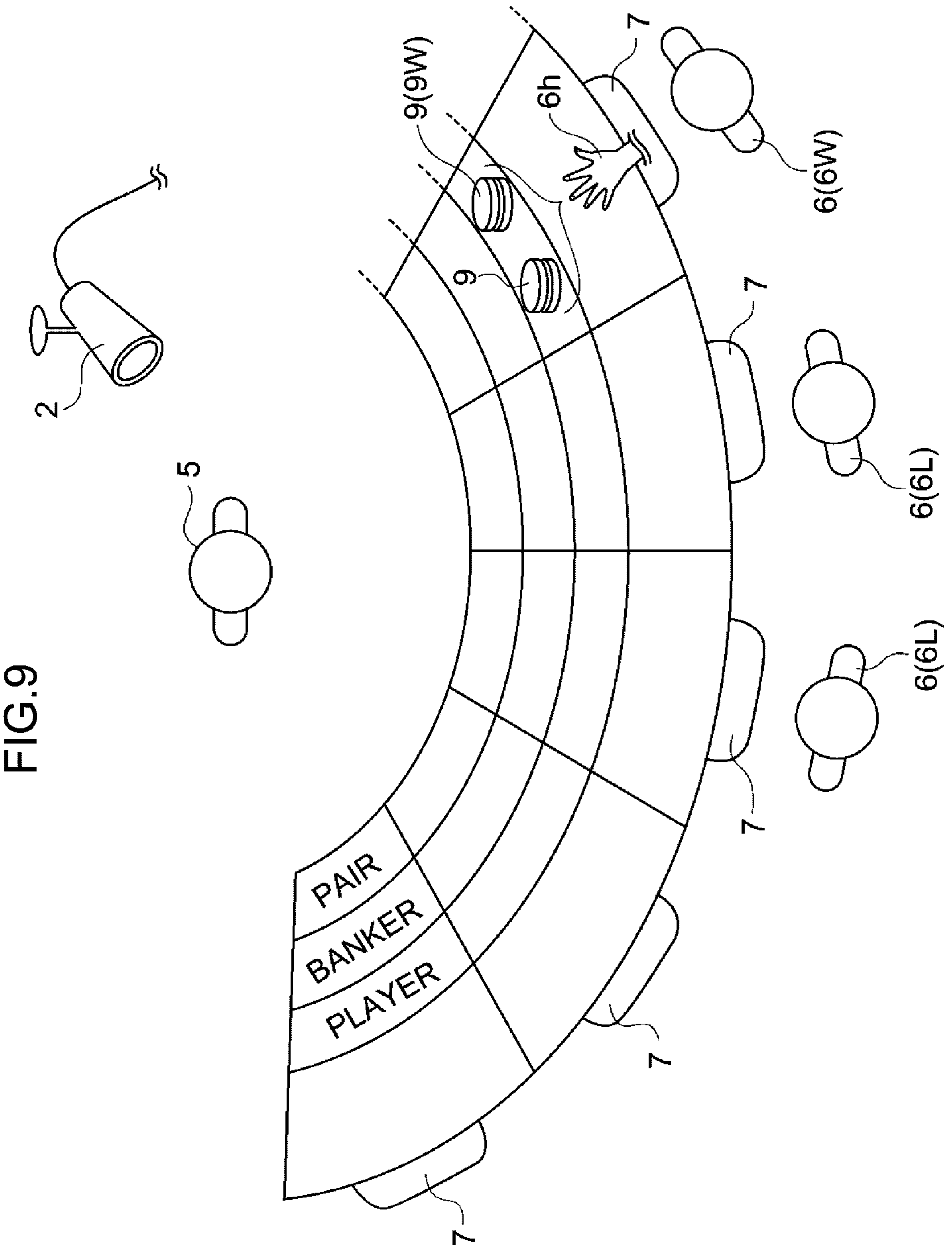
FIG. 9 is an explanatory view illustrating how chips and payments are received by winning customers (game participants) in the Baccarat game according to the embodiment of the present invention.
Figure 20:
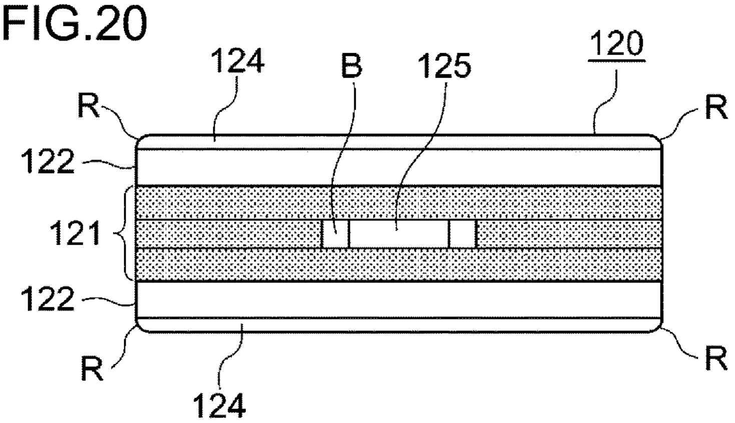
FIG. 20 is a front sectional view of game substitute currency according to the embodiment of the present invention.

Next, details of substitute currency for gaming (chip) used in this detection system will be described. FIG. 8 is a front cross-sectional view of substitute currency 120 (chip 9) for gaming used in this detection system. The substitute currency 120 for gaming has a multi-layer structure in which a plurality of plastic layers having different colors are stacked, a coloring layer 121 is included at least in the middle, and white layers 122 or thin-color layers (while not illustrated in the drawing, the layers may be layers of a color that is thinner than that of the coloring layer 121) are stacked on both sides of the coloring layer 121 of the middle. In this way, by employing a multi-layer structure in which the coloring layer 121 is included, and white layers 122 or thin-color layers (while not illustrated in the drawing, the layers may be layers of a color that is thinner than that of the coloring layer 121) are stacked on both sides of the coloring layer 121 of this middle, as illustrated in FIG. 20, a stripe pattern is formed on the side face in the stacking direction, and the type of the substitute currency 120 for gaming (10 points, 20 points, 100 points, 1000 points, and the like) can be specified by changing the color (red, green, yellow, blue, or the like) of the coloring layer 121.

Figure 22A:
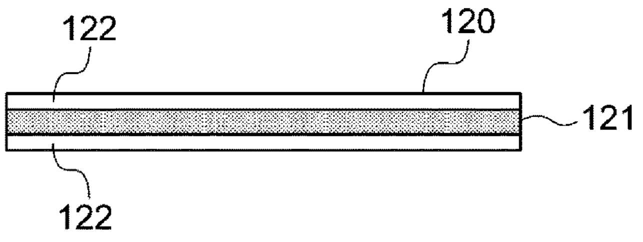
FIG. 22A is a side view of game substitute currency according to the embodiment of the present invention.
Figure 22B:
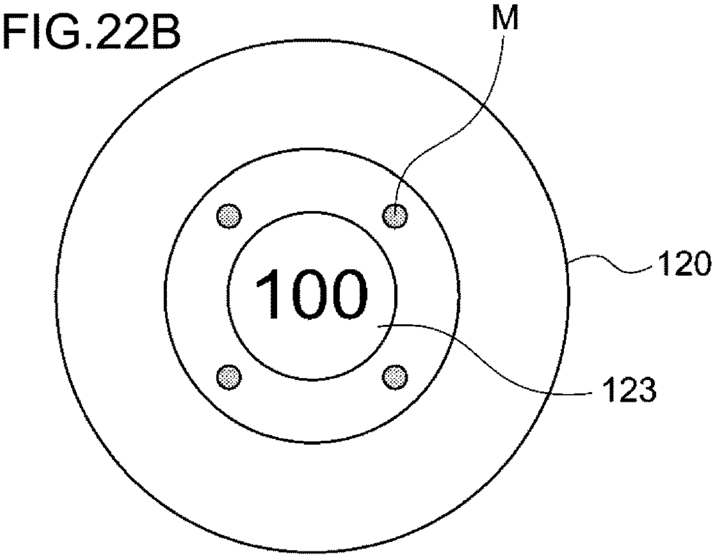
FIG. 22B is a plan view of game substitute currency according to the embodiment of the present invention.

In addition, as illustrated in FIG. 22B, in the substitute currency 120 for gaming, prints 123 (100 points or the like) representing the type of the substitute currency 120 for gaming are formed on the surfaces (the upper face and the lower face) of the white layer 122. As illustrated in FIG. 20, the transparent layers 124 are disposed in the outermost layers, and each interlayer is thermos-compressed, and a structure of at least five layers is formed. Such substitute currency 120 for gaming is formed by using a plastic material having a thin long shape, and layers (the coloring layer 121, the white layer 122, and the transparent layer 124) are thermo-compressed to form a closely adhering state (a structure of five layers or the like) in the state of a long length, and thereafter, holes having a circular shape, a rectangular shape, or the like are formed therein through press or the like. When a hole is formed through the press, die of mold for punching, and the size of punching are designed, and R processing (round angle) is performed for the ends of the transparent layer 124 of the outermost layer.

Figure 21:
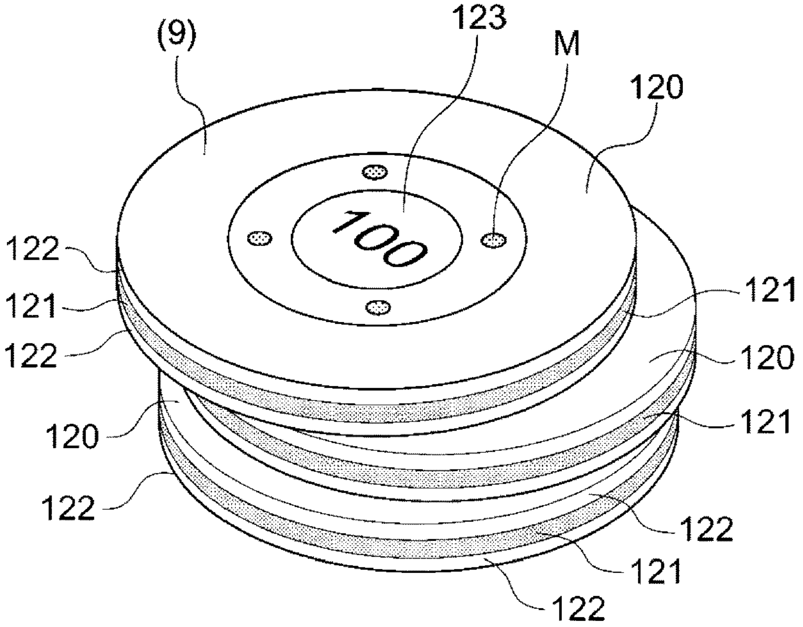
FIG. 21 is a perspective view of a state in which gaming substitute currency grasped in the embodiment of the present invention is stacked.

In addition, in the substitute currency 120 for gaming, mark M using the UV ink or carbon black ink are arranged on the surface of the white layer 122 (see FIG. 21). This mark M represent the authenticity of the substitute currency 120 for gaming, and, when ultraviolet rays (or infrared rays) are emitted thereto, a mark is visible to the eyes, and a combination of the form and the number of the marks represents the authenticity. In the outermost layers, while transparent layers 124 are thermally compressed or formed as coating layers to cover the print 123 and the mark M, embossing processing is performed for these transparent layers 124, and the close adherence between the substitute currencies 120 for gaming is prevented.

The R processing (R) is performed for the ends of the transparent layers 124 of the outermost layer for which the print 123 (100 points or the like), and in the punching process of the substitute currency 120 for gaming, the surfaces of the white layers 122 are prevented from being deformed to appear on the side face. In addition, it is prevented that a sharp end remains in the substitute currency 120 for gaming and damages the hands or the other chips.

The coloring layer 121, as illustrated in FIG. 20, may be formed by a plurality of colored layers (three layers in the case illustrated in FIG. 20). Since the plurality of colored layers (three layers in the case illustrated in FIG. 20) are thermos-compressed, a state in which the three-layer structure can be visually observed, as illustrated in FIG. 20, is not formed. However, three layers are illustrated in FIG. 20 for description. In addition, in a middle layer among the three layers of the coloring layer 121, a partly hollowed portion B is arranged, and an RFID 125 is built therein.

Figure 24:
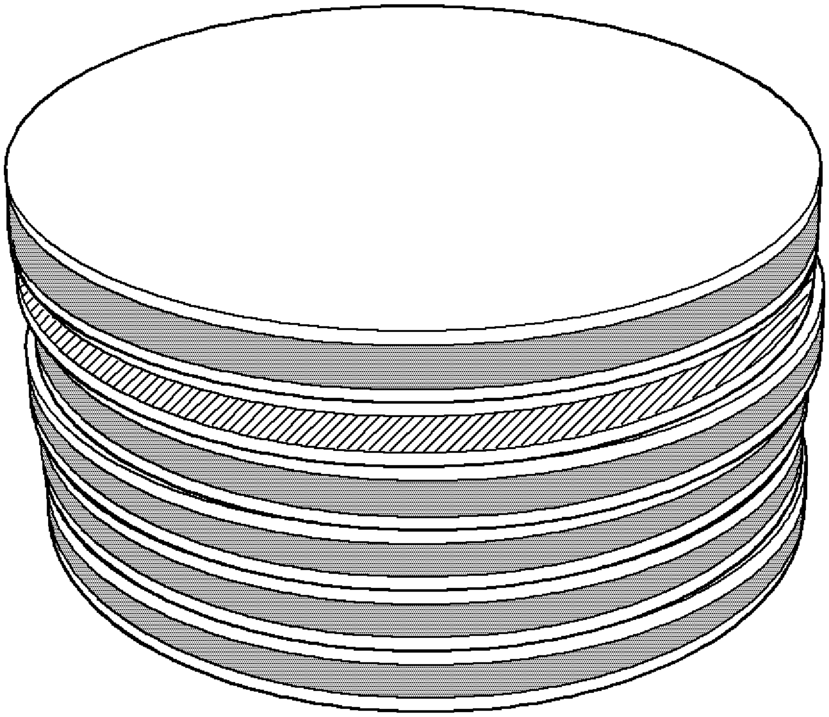
FIG. 24 is a perspective explanatory photograph illustrating a state in which different kinds of game substitute currency are stacked up according to the embodiment of the present invention.

FIG. 24 is a perspective explanatory photographic diagram that illustrates a state in which substitute currency for gaming of different types are piled up. The management control device 14 images substitute currency 120 for gaming placed on the game table 1 by the game participant 6 by using the camera 2 and measures each area 24 (whether the bet is on the banker, the player, the pair, or the tie) in which the substitute currency 120 for gaming (chip 9) is placed by using the measurement device 19 including the image analyzing device 18, and the measurement device 19 (by using information acquired by the image analyzing device 18) analyzes and measures the number and the colors of coloring layers 121 (or the thin-color layers) or white layers 122 of the substitute currency 120 for gaming that is stacked in each area and determines the types and the quantities of the substitute currency 120 for gaming.

The management control device 14 may be a control device having an artificial intelligence-utilizing or deep learning structure. The management control device 14 can perceive the position 24 (a position betting on a player, a banker, or a pair), the types (a value of a different amount is assigned to the substitute currency 120 for gaming for each color), and the quantities of the substitute currency 120 for gaming that is bet by each participant 6 through the camera 2 and the image analyzing device 18. The artificial intelligence-utilizing computer or control system can perceive the position 8 (a position betting on a player, a banker, or a pair), the types (a value of a different amount is assigned to the substitute currency for gaming for each color), and the quantities of the substitute currency 120 for gaming by using a self-learning function or the like in the deep-learning (structure) technology, and thus, according to a result of winning/losing of a game determined by the card distributing device 3 in each game, determines whether or not the collection (denoted using an arrow L) of substitute currency 120 for gaming bet by a losing participant 6L and the re-payment (payment (9W)) for winning substitute currency 120 for gaming for the winning game participant 6W are appropriately performed according to a result of winning/failure of the game in each game by analyzing a video of the state of progress of the game by using the management control device 14 through the image analyzing device 18.

In such a case, as illustrated in FIG. 21 (compared to conventional chip illustrated in FIG. 19), a stacked multi-layer structure is formed, and a stripe pattern is formed on the side face in the stacking direction, and accordingly, the measurement device 19 including the image analyzing device 18 can accurately perform the measurement of the types and the quantities of schips in an easy manner. In addition, by using an artificial intelligence-utilizing computer or control system and a deep-learning (structure) technology, the analysis and the determination of the image can be performed more accurately. The artificial intelligence-utilizing computer or control system and the deep-learning (structure) technology are known to persons skilled in the art and can be used, and thus, detailed description thereof will be abbreviated.

The management control device 14 can analyze and perceive a total amount of substitute currency 120 for gaming in the tray 17 for substitute currency for gaming for the dealer 5 of the game table 4 by using the image analyzing device 18 and can determine through a comparison and calculation whether or not a total amount of the substitute currency 120 for gaming placed inside the tray 17 for substitute currency for gaming has been increased/decreased according to the collection of the losing substitute currency 120 for gaming bet by each game participant 6 and the amount of the payment 9W for winning substitute currency for gaming to the winning game participant 6W after the game ends and is settled based on the result of winning/losing of the game. The total amount of the substitute currency 120 for gaming in the tray 17 for substitute currency for gaming may be constantly acquired by using means such as RFIDs, and it is determined whether or not the increased/decreased amount is correct by the management control device 14 by analyzing a video of the state of progress of the game through the image analyzing device 18. For these, an artificial intelligence-utilizing or deep-learning structure may be utilized.

In addition, the management control device 14 may have an artificial intelligence-utilizing or deep-learning structure capable of acquiring the position (a position for betting on the player, the banker, or the fair) and the amount (the types and quantities) of bet substitute currency for gaming at each player position 7 of the game table 4, comparing a winning/losing history of each player 6 and the amount (won amount) of acquired substitute currency for gaming that can be acquired based on the result of winning/losing of each game with statistical data of many (big data) games in the past, and extracting an abnormal situation (set in the casino). Typically, the management control device 14 is included which has an artificial intelligence-utilizing or deep-learning structure capable of extracting an occurrence of a won amount of a certain amount (one million dollars) or more and an abnormal situation in which, in a play position 7 of a specific game table 4, a state in which the amount of bet substitute currency for gaming is small at the time of losing a game, and the amount of bet substitute currency for gaming is large at the time of winning a game is continued for several games and is determined as an abnormal situation based on a comparison with statistical data (big data or the like) of games in the past.

The total amount of the substitute currency 120 for gaming in the tray 17 for substitute currency for gaming for the dealer 5 of the game table 4 is settled for the substitute currency 120 for gaming bet by each participant 6 after each game, and the management control device 14 has a structure capable of determining through a comparison and calculation whether or not an increase/decrease in the substitute currency for gaming that corresponds to a settlement is correct after the settlement. In the chip tray 17 used for storing the substitute currency 120 for gaming (chips 9) for the dealer 5 illustrated in FIG. 18, the types and the quantities of the substitute currency 120 for gaming can be determined by analyzing and measuring the numbers and the colors of the coloring layers 121 or the white layers 122 of the substitute currency 120 for gaming stacked in the horizontal direction by using the measurement device 19 (by using the information acquired by the image analyzing device 18). The total amount of the substitute currency 120 for gaming for the chip tray 17 for storing substitute currency for gaming is constantly (or at predetermined time intervals) acquired in this way. As the management control device 14 has a calculation function of calculating a settlement amount (calculation of a balance of the casino side in the game table 1 (an amount acquired by subtracting a total amount of the substitute currency 120 for gaming (chips 9) re-paid to the winner 6W among the participants 6 from a total amount of the substitute currency 120 for gaming (chips 9) bet by the loser 6L) of each game for each game (see description presented in [0053]), the total amount of the substitute currency 120 for gaming of the chip tray 17 for substitute currency for gaming is constantly (or at intervals of a predetermined time) is verified. That is, it is verified whether or not an increase/decrease in the substitute currency for gaming matches a result of an image analysis performed by the image analyzing device 18 and the settlement amount of each game performed by the dealer 5.

Figure 23:
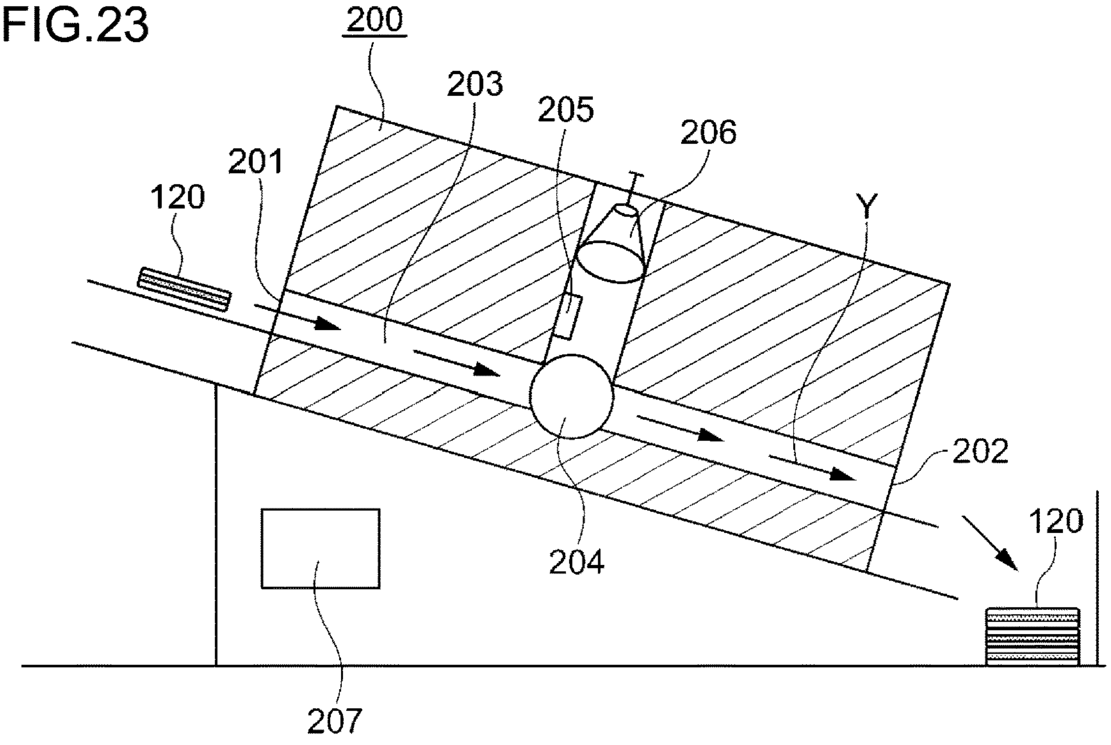
FIG. 23 is a side cross-sectional view of an inspection apparatus for gaming substitute currency according to the embodiment of the present invention.

Next, an inspection device 200 inspecting the substitute currency 120 for gaming according to an embodiment of the present invention will be described with reference to FIG. 23. The inspection device 200 includes a passage 203 that includes an inlet 201 through which substitute currency 120 for gaming can pass in the radial direction (the direction of an arrow Y) and an outlet 202. The passage 203 inclines, and the substitute currency 120 for gaming passes in the direction of the arrow Y). In the passage 203, a chip type determining device 204 that images the side face of the substitute currency 120 for gaming and determines the color of a stripe pattern of the side face in the stacking direction; a mark reading device 205 that reads a mark M using UV ink or carbon black ink arranged on the surface of the passing substitute currency 120 for gaming; a print inspecting device 206 that reads the print 123 representing the type arranged on the surface of substitute currency for gaming in the vertical direction with respect to the passage 203; and a control device 207 for the whole device. The control device 207 is configured to inspect whether or not the chip type determined by the chip type determining device 204 matches a content of the print representing the type acquired from the print inspecting device 206.

By using this inspection device 200, it can be inspected whether or not the print 123 of the manufactured substitute currency 120 for gaming matches the chip type according to the color of the stripe pattern of the substitute currency 120 for gaming and is correctly printed.

A system according to this embodiment relates to a management system of substitute currency for gaming preventing the use of fake substitute currency for gaming in a game house in a casino or other game facilities using substitute currency for gaming.

Among many live table games played in a casino or a game facility, there are Baccarat and blackjack. In such games, a standard deck configured by 52 playing cards is used, and playing cards are distributed to a game table from a shooter including a plurality of decks (6 to 9 decks or 10 decks) shuffled in advance, and a game is played. In a casino or a game facility, substitute currency for gaming is used for such games.

The use of fake substitute currency for gaming should not occur in a casino. In order to prevent the use of fake substitute currency for gaming in a casino, there is a technology for preventing the use of fake substitute currency for gaming by attaching an RFID to substitute currency for gaming. The RFID-attached substitute currency for gaming is known and is disclosed in WO 2008/120749 A.

This embodiment provides a management system or substitute currency for gaming preventing the use of fakes of substitute currency for gaming used in a casino or a game facility, and the use and unjust exchange of fake substitute currency for gaming in a casino or a game facility can be prevented. In recent years, the technologies for manufacturing fake substitute currency for gaming evolve, and technologies advance up to a level of copying an authenticity determination mark or an RFID almost perfectly. As a result, a mark or an RFID that is the same as a genuine authenticity determination mark or a genuine RFID is attached to substitute currency for gaming, genuine and fake substitute currency for gaming cannot be discriminated from each other, and there is a problem in that it is almost impossible to perform an authenticity determination.

In order to solve the conventional problem described above, a management system of substitute currency for gaming according to this embodiment includes: substitute currency for gaming to which a unique ID that can be individually identified is attached; an ID reading device that reads a unique ID attached to the substitute currency for gaming; a storage in which the substitute currency for gaming is stored in a cashier of a game house; a game table chip tray that stores the substitute currency for gaming; a chip determining device that specifies types and quantities of the substitute currency for gaming stored in the game table chip tray and the storage by using the ID reading device; and a management control device that manages the IDs associated with the substitute currency for gaming in a database. The management control device has functions of registering the IDs of the substitute currency for gaming to be used in the database in advance, managing the IDs of the substitute currency for gaming present at least in the game table chip tray and the storage in the database together with presence information by using the database, specifying the substitute currency for gaming in the game table chip tray and the storage at predetermined timing, searching the database, determining the following events through the database search 1) an ID not present in the database is newly present 2) two or more same IDs are present, and generating an error signal when a situation of 1) or 2) described above is present.

In addition, the management control device has functions capable of, when there is a change in the presence of the substitute currency for gaming at least in the game table chip tray and the storage, recording time or a place at which there is the change in the database in association with the ID, searching the database, when there is a situation in which two or more same IDs are present, extracting the ID and information of time or a place recorded in association with the ID in the database from the database and storing extracted information, and specifying time when the substitute currency for gaming to which the ID is attached, which is detected first, enters/exits the game table chip tray or the storage or a place of the game table chip tray or the storage in which the substitute currency for gaming is stored.

Furthermore, the management system of substitute currency for gaming may further include: a bet area chip determining device specifying the types and quantities of the substitute currency for gaming bet on a bet area of the game table by using the ID reading device and may have functions of determining the following events through a search of the database also for the ID of the substitute currency for gaming present in the bet area of the game table 1) an ID that has not been present in the database is newly present 2) presence of two or more same IDs and generating an error signal when there is a situation of 1) or 2) described above.

In addition, unique IDs are attached to at least three positions on the side face of the substitute currency for gaming. The unique IDs are attached through inkjet printing by using ink that is visible using visible light. Particularly, a configuration is advantageous in which the unique ID is attached as presence/absence of marks of a plurality of rows and a plurality of columns. In addition, transparent coating layers or varnish is disposed on the upper and lower faces of the substitute currency for gaming.

In order to solve the conventional problems, substitute currency for gaming according to this embodiment forms a stripe pattern on the side face in the stacking direction by employing a multi-layer structure in which a plurality of plastic layers having different colors are stacked, a coloring layer is included at least in one layer, white layers or thin-color layers are stacked on a further outer side than the coloring layer and has a configuration enabling the type of the substitute currency for gaming to be specified by the coloring layer. In addition, unique IDs are attached to at least three positions on the side faces of the white layers and the thin-color layers, and the type and the manufacturing information of substitute currency for gaming can be specified by reading the ID by using the ID reading device, and a configuration in which the ID can be managed in a database is included. Then, the unique ID may be attached using ink that is visible for visible light through inkjet printing. The unique ID may be attached using ink that is not visible for visible light through inkjet printing.

In order to solve the conventional problems described above, substitute currency for gaming according to this embodiment has a unique ID that can be individually identified attached thereto, the unique ID attached to the substitute currency for gaming is read by an ID reading device, the ID reading device can read the substitute currency for gaming stored in a storage maintained by a cashier of a game house and a chip tray of a game table, in addition, the types and the quantities of the substitute currency for gaming stored in the chip tray and the storage are specified by a gaming substitute currency determining device through the ID reading device, the ID of the substitute currency for gaming present in the chip tray of the game table and the storage is managed in the database together with the presence information thereof, it is inspected whether at least 1) an ID that has not been present in the database is newly present and 2) two or more same IDs are present, and the ID enabling the occurrence of the situation 1) or 2) described above to be determined is included.

Figure 25:
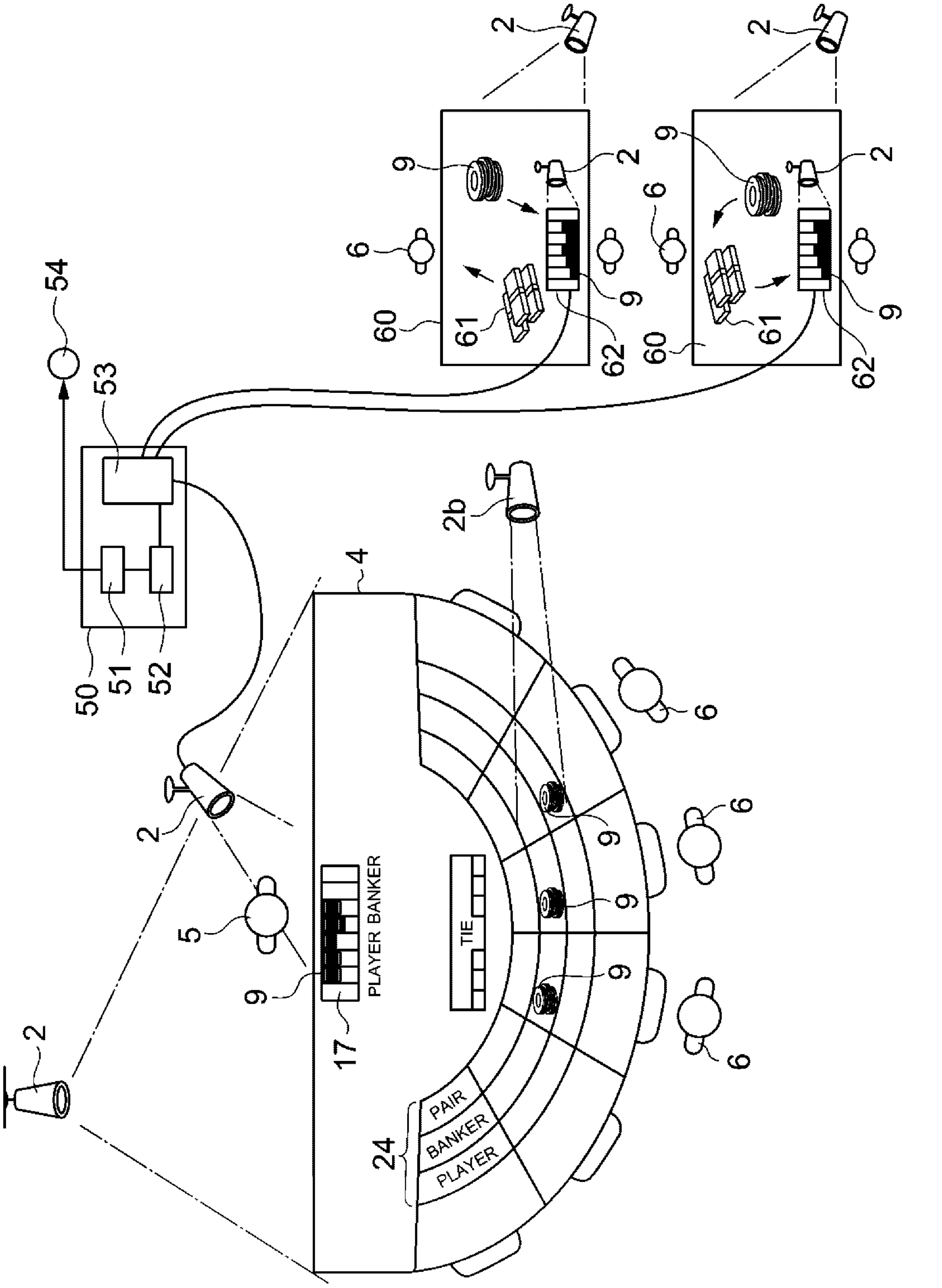
FIG. 25 is a diagram illustrating an overview of a management system for gaming substitute currency according to the embodiment of the present invention.

Hereinafter, a management system of substitute currency for gaming in a game house including a game table according to an embodiment of the present invention will be described with reference the drawings. FIG. 25 is a diagram that illustrates an overview of the whole system. The management system of substitute currency for gaming in a game house including a plurality of game tables 4 (only one game table is illustrated in FIG. 25) images the state of progress of a game played in the game table 4 including a game participant 6 and a dealer 5 through a plurality of camera devices 2 and stores and manages the state. Particularly, the management system of substitute currency for gaming specifies the types and the quantities of substitute currency 9 for gaming used in the game table 4 by analyzing image information acquired by the camera device 2. A unique ID 126 is attached to the side face of the substitute currency 120 for gaming, and the types and the quantities of the substitute currency 120 for gaming is acquired by determining the ID 126 and reading the types and the quantities. An ID reading device 53 disposed inside a management control device 50 connected to the camera 2 specifies the ID 126 by analyzing image information acquired from the camera 2. Particularly, the management control device 50 includes a chip determining device 52 specifying the types and the quantities of the substitute currency 9 for gaming that is in a horizontally aligned state or in a piled state based on a result of the reading of the ID 126 acquired by analyzing the image data imaged through the camera 2 therein.

In a plurality of cashiers 60 present in a game house, the substitute currency 9 for gaming is exchanged with cash 61 paid by a game participant 6, and, in a cashier 60, substitute currency 9 for gaming is stored in a storage 62 storing the substitute currency 9 for gaming. In the cashier 60 of a game house, substitute currency 9 for gaming brought by a game participant 6 is refunded into cash 61. In the game table 4, substitute currency 9 for gaming is stored in a game table chip tray 17, and a dealer 5 collects substitute currency 120 for gaming bet by a game participant 6 who has lost the game from the table 4 in each game, returns the collected substitute currency 9 for gaming to the game table chip tray 17, and then re-pays the substitute currency 9 for gaming to a game participant 6 who has won each game. All such exchanges between a game participant 6 and a cashier 60 of a game table or a dealer 5 are imaged and recorded by all the camera devices 2. In the storage 62 or the game table chip tray 17, when there is exchange of substitute currency 9 for gaming with a game participant 6, the substitute currency 9 for gaming stored in the storage 62 or the game table chip tray 17 increases or decreases. The types and the quantities of the substitute currency 9 for gaming stored in the game table gaming substitute currency tray 17 and the storage 62 are monitored at predetermined timing or constantly by the ID reading device 53 and the chip determining device 52 through the camera 2. The management control device 50 stores the IDs 126 of all the substitute currency 9 for gaming assumed to be used in a game house in the database 51 in advance (the IDs 126 of all the substitute currency 120 for gaming assumed to be used in the game house are registered).

In this way, in the game house, by using the database 51, the management control device 50 managing the IDs 126 associated with substitute currency 9 for gaming manages all the side IDs 126 of at least substitute currency 9 for gaming present in the game table chip tray 17 and the storage 62 in the database 51 together with the presence information thereof (the storage 62, the game table chip tray 17, in the middle of moving from a backyard (not illustrated in the drawing), held by a game participant 6, or the like). The management control device 50 specifies all the substitute currency 9 for gaming disposed in the game table chip tray 17 and the storage 62 by using the IDs 126 at predetermined timing or constantly, searches the database 51, and determines the following events through the search of the database 51: 1) A ID 126 that has not been present (or not present) in the database 51 is determined to be newly present; and 2) Two or more same IDs are determined to be present.

The management control device 50 has a function of generating an error signal representing an abnormality and giving a notification to a management division or a security division 54 of the game house when the situation of 1) or 2) described above is present. The management control device 50 specifies all the substitute currency 9 for gaming disposed in the game table chip tray 17 and the storage 62 at predetermined timing or constantly by using the IDs 126 and stores all the substitute currency 9 for gaming in the database 51 and thus, can determine that 1) a ID 126 that has not been present (or not present) in the database 51 is newly present and 2) two or more same IDs are present.

In addition, when there is a change in the presence of the substitute currency 9 for gaming at least in the game table chip tray 17 and the storage 62, the management control device 50 records time or a place (the storage 62, the game table chip tray 17, or the like) at which the change is present in the database 51 in association with the ID 126 and, as a result of the search of the database 51, when there is a situation in which two or more same IDs 126 are present, extracts the ID 126 and information of time or a place recorded in the database 51 in association with the ID 126 from the database 51 and stores the ID and the information that have been extracted, and thus, time at which substitute currency 9 for gaming to which the ID 126 is attached, which has been detected first (used first or cashed), enters/exits the game table chip tray 17 or the storage 13 or a place of the game table chip tray 17 or the storage 13 in which the substitute currency 9 for gaming is stored can be specified by using the database 51. When the time and the place can be specified, a suspicious person for the use of unjust substitute currency 9 for gaming or the like can be specified from the recorded video of the camera 2.

In this management system of substitute currency for gaming, the management control device 50 can specify the types and the quantities of the substitute currency 9 for gaming bet on the bet area 16 of the game table 4 by using the ID reading device 53. The substitute currency 9 for gaming of the bet area 16 is imaged by the camera **2*b* that particularly images the bet area 24 and, also for the ID 126 of the substitute currency 9 for gaming present on the bet area 24 of the game table 4, determines the following events by searching the database 51: 1) A ID 126 that has not been present in the database 51 is newly present in the bet area 16**; and 2) Two or more same IDs are present.

The management control device 50 has a function of generating an error signal when a situation of 1) or 2) described above is present.

The management control device 50 of this system, the ID reading device 53 disposed inside, and the chip determining device 52 specifying the types and the quantities of substitute currency 9 for gaming have a structure integrally including a computer formed as one body or by a plurality of configurations, a program, and a memory.

Figure 26:
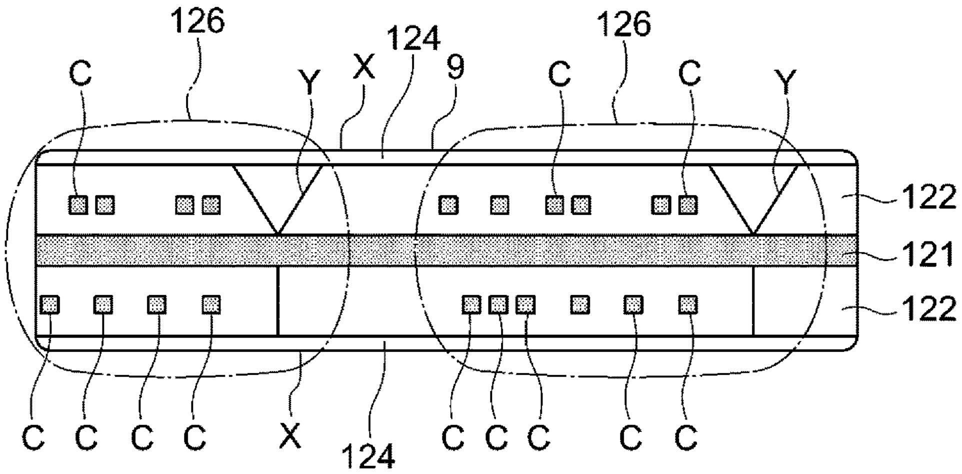
FIG. 26 is a side view of game substitute money according to the embodiment of the present invention.

Next, details of substitute currency 9 for gaming (so-called substitute currency for gaming) used in this system will be described. FIG. 26 is a front view of substitute currency 9 for gaming (chip) used in this system, the substitute currency 9 for gaming is formed by stacking a plurality of plastic layers having different colors, forming the plastic layers to be integrated using a means of thermo-compressing or the like, and then, punching holes in the shapes of circles and quadrangles. The substitute currency 9 for gaming manufactured in this way has a multi-layer structure in which a coloring layer 121 is included at least in the middle, and white layers 122 or thin-color layers (may be layers of a color thinner than that of the coloring layer 121; not illustrated in the drawing) are stacked on both sides (in FIG. 26, the upper and lower sides) of the coloring layer 121 disposed in the middle. In this way, by employing the multi-layer structure in which the coloring layer 121 is included, and the white layers 122 or the thin-color layers (may be layers of a color thinner than that of the coloring layer 121; not illustrated in the drawing) are stacked on both sides of the coloring layer 121 disposed in the middle, as illustrated in FIG. 17, a stripe pattern (in the stacking direction) when seen from the side face is formed, and, by changing the color (red, green, yellow, blue, or the like) of the coloring layer 121 of the substitute currency 9 for gaming, the type of the substitute currency 9 for gaming (10 points, 20 points, 100 points, 1000 points, and the like) can be specified.

In addition, as illustrated in FIG. 26, in the substitute currency 9 for gaming, a ID 126 representing the type of substitute currency 9 for gaming is applied to the side faces of the white layers 122.

In the outermost layers, transparent layers 124 are arranged, and each interlayer is thermo-compressed to form a structure of at least five layers. Such substitute currency 9 for gaming is formed by using a plastic material having a thin long shape, and layers (at least the coloring layer 121 and the white layers 122) are thermo-compressed to form a closely adhering state (the structure of five layers or the like) in the state of a long length, and thereafter, holes having a circular shape, a rectangular shape, or the like are formed therein through press or the like. When a hole is formed through the press, die of mold for punching, and the size of punching are designed, and R processing (round angle) is performed for the ends of the transparent layer 124 of the outermost layer. The transparent layers 124 may be a coat layer of varnish. The unique ID 126 is attached to at least three positions on the side face of the substitute currency 9 for gaming. The unique ID 126 is attached through inkjet printing using ink that is visible for visible light.

Figure 28:
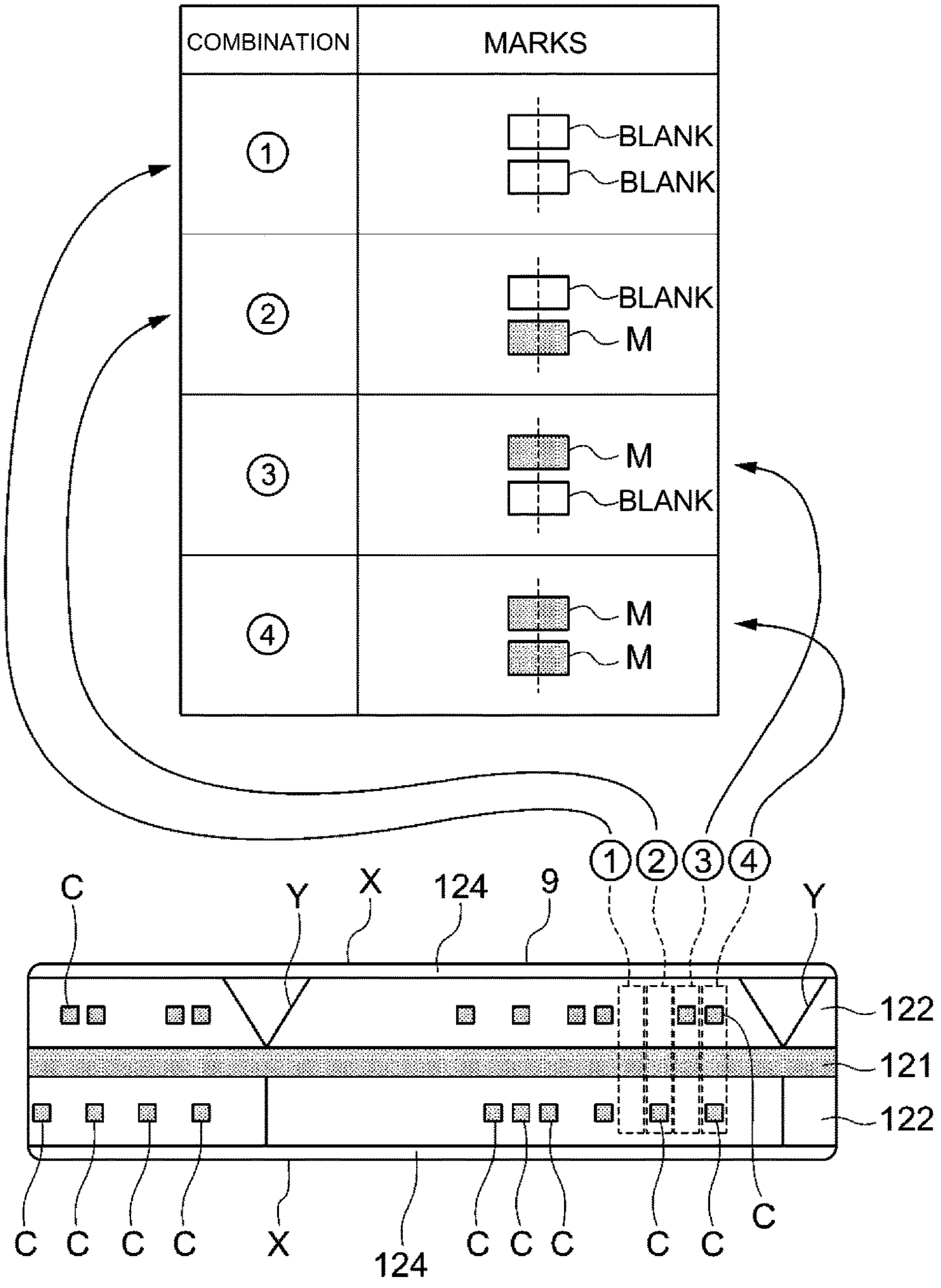
FIG. 28 is an explanatory diagram of an ID (represented by a plurality of rows of codes) attached to a gaming substitute currency according to the embodiment of the present invention.

Particularly, in this embodiment, the unique ID 126 is configured to be attached as presence/absence of marks C of a plurality of rows and a plurality of columns. In the marks C of the plurality of rows and the plurality of columns, as illustrated in FIG. 26, upper and lower marks C are paired to configure a code, and a code of ten digits is formed in the case illustrated in FIG. 26. A configuration in which upper and lower marks C are paired to configure a code (four types) is illustrated in FIG. 28. A letter "Y" disposed to the side of marks C is an identification mark used for identifying upper and lower sides of a mark. A code configured by marks C is configured to specify a predetermined combination of marks C. As a result, in the example illustrated in FIG. 28, there are four types of combination of the marks C of upper and lower two columns, and, by printing these in ten columns, four to the power of 10 codes can be configured. Since there are four types of a 10-digit code, 4 to the power of 10 codes are acquired, and accordingly, the unique IDs 126 of substitute currency 9 for gaming can be sufficiently assigned.

The substitute currency 9 for gaming forms a stripe pattern on the side face in the stacking direction by employing a multi-layer structure in which a plurality of plastic layers having different colors are stacked, the coloring layer 121 is included at least in one layer, the white layers 122 or the thin-color layers are stacked on a further outer side than the coloring layer 121 and has a configuration enabling the type of the substitute currency 9 for gaming to be specified using the coloring layer 121. The side IDs 126 are disposed at least three positions (preferably, six positions) on the side face of the white layer 122 or the thin-color layer, and, in this example, six IDs are disposed at a predetermined interval of 60 degrees in the rotation direction. The unique IDs 126 individually identifiable (different for each one) are attached to substitute currency 9 for gaming, and the unique IDs 126 are disposed at a predetermined interval of 60 degrees in the rotation direction (circumferential direction) such that the side ID is necessarily seen from the lateral side. The unique IDs 126 attached to the substitute currency 9 for gaming are read by the ID reading device 53 described above. The type, the manufacturing information, and the like of substitute currency 9 for gaming can be specified by reading the side ID 126 by using the ID reading device 53, and a configuration in which the ID 126 can be managed in the database 51 is formed. In this embodiment, the unique IDs are attached using ink that is visible for visible light through inkjet printing. The unique IDs 126 may be attached by inkjet printing using invisible ink (UV ink, carbon black ink, or infrared reactive ink) that is invisible for visible light.

Figure 27A:
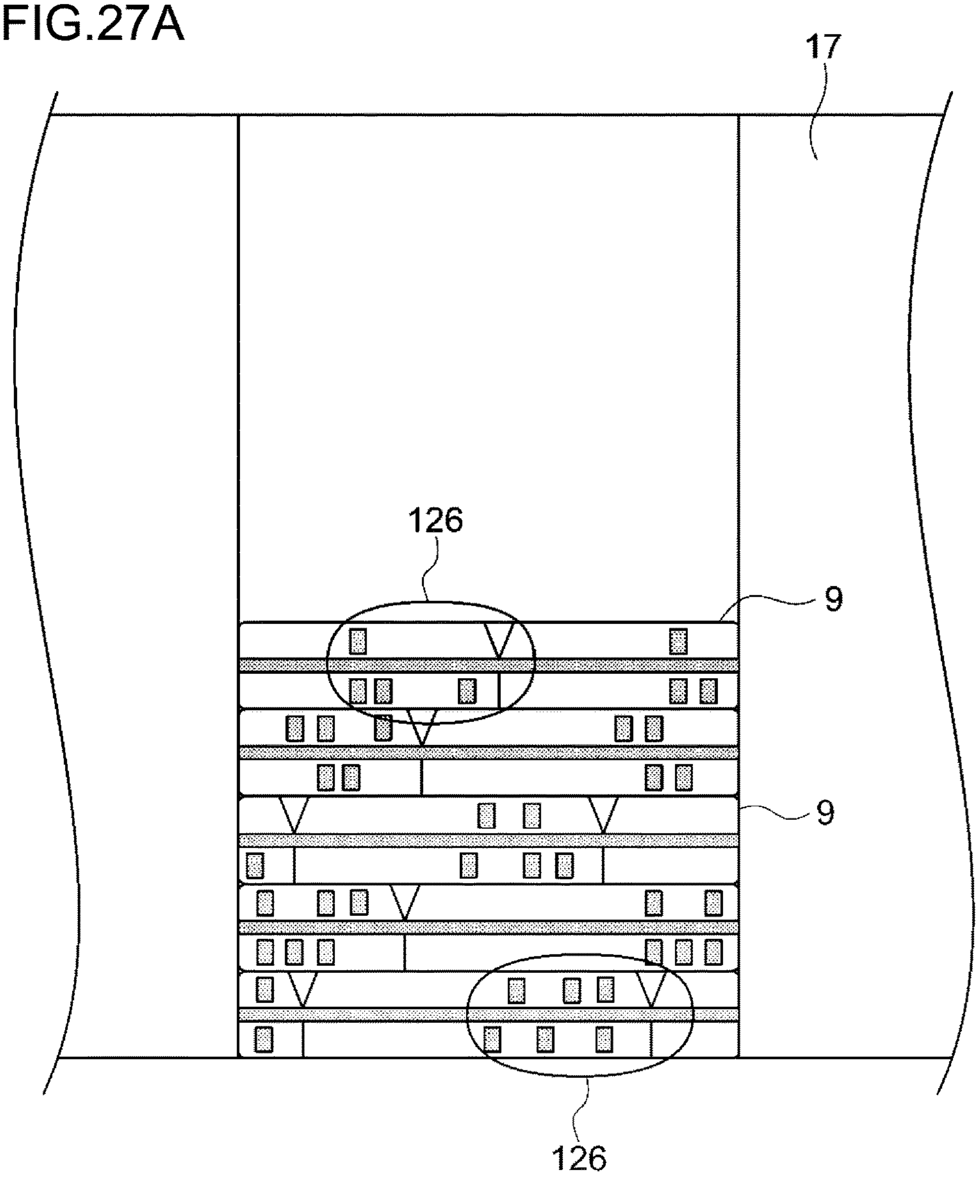
FIG. 27A is a plan view of a main part of a chip tray illustrating a state in which one game substitute currency according to the embodiment of the present invention is held on a chip tray of a casino table.
Figure 27B:
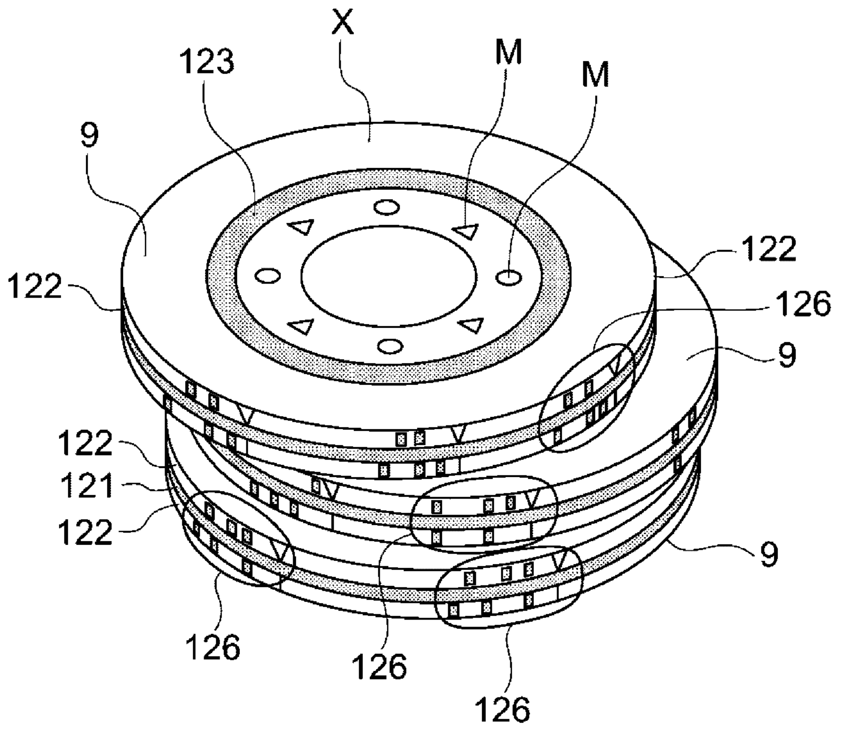
FIG. 27B is a perspective view of a state in which gaming substitute currency is stacked.

The unique IDs 126 attached to the substitute currency 9 for gaming are read by the ID reading device 53 described above, and the ID reading device 53 can read the substitute currency 9 for gaming held in the storage 62 of a cashier of a game house and the game table chip tray 17 of the game table, and actually, as illustrated in FIG. 27A, when the substitute currency 9 for gaming is stacked horizontally, the IDs 126 can be read.

Furthermore, in the substitute currency 9 for gaming, a mark M using UV ink or carbon black ink is arranged on the surface (X) of the white layer 122. This mark M represents authenticity of substitute currency 9 for gaming, and, when ultraviolet rays (or infrared rays) hit the mark M, the mark M becomes visible to the eyes and represents authenticity based on a combination of the forms and a number. While the transparent layers 124 are thermos-compressed or coated in the outermost layers to cover a print 123 (100 points or the like) used for specifying a game house and a mark M disposed on the surface, embossing process or varnish processing is performed for the transparent layers 124, and the substitute currency 9 for gaming is prevented from adhering to each other and is caused to slide well.

The R processing (R) is performed for the ends of the transparent layers 124 of the outermost layers for which a print 123 (100 points or the like) is performed, and, in the punching process of the substitute currency 100 for gaming, the surfaces of the white layers 122 are prevented from being deformed to appear on the side face. In addition, it is prevented that a sharp end remains in the substitute currency 100 for gaming and damages the hands or the other chips 9. The coloring layer 121 may be formed by colored one layer or a plurality of layers. In addition, metal or ceramic used for increasing the weight may be built in a layer included in the layer of the coloring layer 121. In addition, a part of the coloring layer 121 is hollowed out, or a space is arranged between the coloring layer 121 and the white layer 122, and an RFID may be built therein. In such a case, as the ID 126 of the substitute currency 9 for gaming, a ID 126 according to a code using the marks C and a ID using the RFID are used together.

In the substitute currency 9 for gaming configured in this way, the types and the quantities of the substitute currency 9 for gaming that is held in the game table chip tray 17 and the storage 62 are specified by the chip determining device 52 through the camera 2 and the ID reading device 53, and the IDs 126 of the substitute currency 9 for gaming present on the game table chip tray 17 and the storage 62 are managed in the database 51 together with the presence information thereof. In this way, at least, it is inspected whether 1) a ID 126 that has not been present in the database 51 is newly present 2) two or more same IDs 126 are present. By determining the occurrences of the situations of 1) and 2) described above by searching for all the IDs 126, the inspection is realized.

The management control device 50 may be a control device having an artificial intelligence-utilizing or deep learning structure. The management control device 50 can perceive the position 24 (a position betting on a player, a banker, or a pair), the types (a value of a different amount is assigned to the substitute currency for gaming for each color), and the quantities of the substitute currency 9 for gaming by using an artificial intelligence-utilizing type computer or control system, a deep-learning (structure) technology, a self-learning function, or the like.

Figure 29:
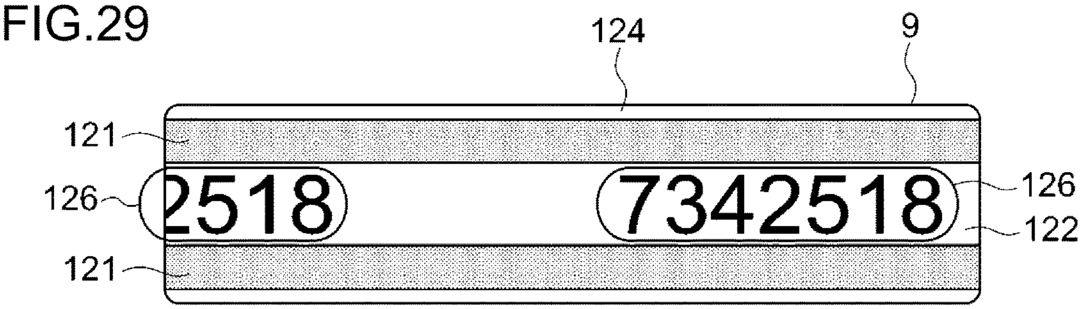
FIG. 29 is a side view of an ID attached to game substitute currency according to another embodiment of the present invention.

Hereinafter, a modified example of the substitute currency 9 for gaming will be described. In the modified example, on the side face of the substitute currency 9 for gaming, a seven-digit number is printed as the ID 126. In the example illustrated in FIG. 29, a white layer 122 is disposed in the middle, and, under the white layer, a coloring layer 121 is disposed. A number as a mark is printed on the white layer 122 disposed in the middle and configured a ID 126. When 10 types of combinations of numbers are printed in seven digits, 10 to the power of 7 codes can be configured, and accordingly, the unique IDs 126 of substitute currency 9 for gaming can be sufficiently assigned. In the camera 2 and an image analysis thereof, there are cases where it is difficult to determine and read a number, a combination of marks C described in the previous embodiment is considered to be advantageous in the image analysis.

REFERENCE SIGNS LIST

- 1 Playing card
- 1*s* Plurality of sample playing card
- 2 Camera, Monitoring camera
- 3 Card distributing device that determines and displays a result of winning/losing of game
- 4 Game table
- 5 Dealer
- 6 Player (Guest, game participant
- 7 Chair
- 8 Bet area
- 9 Chip (Substitute currency for gaming)
- 10 Area
- 10P Player area

10B Banker area
11 Game recording device (Game monitoring device)
12 Image analyzing device that performs an image analysis of the recorded video
13 Result display lamp
14 Intelligent-type control device (Control device, Management control device)
14C Card distribution detecting device
15 Output (abnormality determination result and the like)
16 Abnormality display lamp
17 Gaming substitute currency tray (Chip tray)
18 Image analyzing device
19 Measurement device
30 Distribution limiting device
33 Slot
34 Lock member
35 Driving unit
36 Lock member
37 Driving unit
40 Distribution limiting device
50 Management control device
53 ID reading device
52 Chip determining device
62 Storage
51 Database
102 Card housing unit
103 Index
105 Card guiding unit
106 Opening portion
107 Card guide
109 Control unit
112 Side monitor
120 Substitute currency for gaming
126 ID
200 Inspection device
K Bill
M Mark

The invention claimed is:

1. A gaming chip recognition system for a casino, the gaming chip recognition system comprising:

a camera configured to capture an image of a plurality of gaming chip stacks from diagonally above the plurality of gaming chips to capture the plurality of gaming chip stacks, each gaming chip stack of the plurality of gaming chip stacks having a different distance from the camera; and at least one processor configured to:

perform an image analysis of the image using an artificial intelligence technology or deep learning technology to recognize the plurality of gaming chip stacks that appeared in the image;

determine respective numbers of gaming chips of each chip stack of the recognized plurality of gaming chip stacks;

recognize a position on a game table of at least one gaming chip included in the plurality of gaming chip stacks, the position including coordinates on the game table; and based on the position of the at least one gaming chip, determine a purpose of the gaming chip being placed on the game table.

2. The gaming chip recognition system according to claim 1, wherein the at least one processor is further configured to determine position of each of the plurality of gaming chip stacks.

3. The gaming chip recognition system according to claim 1, wherein the at least one processor is further configured to recognize types of the gaming chips in the gaming chip stacks.

4. The gaming chip recognition system according to claim 1, wherein the at least one processor is further configured to recognize chip IDs of the gaming chips in the gaming chip stacks.

5. The gaming chip recognition system according to claim 1, further comprising:

a chip ID reader configured to read chip IDs of gaming chips held in a chip tray, and wherein:

each gaming chip of the gaming chips has the chip ID by means of RFID, and the chip ID reader reads the RFIDs of the gaming chips held in the chip tray.

6. The gaming chip recognition system according to claim 1, wherein the at least one processor is configured to perform the image analysis of the image which is captured according to a predetermined trigger by the camera.

7. The gaming chip recognition system according to claim 1, wherein the camera is configured to capture gaming chips placed in a betting area on a gaming table.

8. The gaming chip recognition system according to claim 1, wherein the camera is configured to capture gaming chips placed on a chip tray of a gaming table.

9. The gaming chip recognition system according to claim 1, wherein the camera is configured to capture gaming chips placed in a storage.

10. The gaming chip recognition system according to claim 1, wherein the camera is configured to capture gaming chips during transit from a backyard.

11. The gaming chip recognition system according to claim 1, wherein the at least one processor is configured to recognize, by using the artificial intelligence technology, a gaming chip stack even when a portion of the gaming chips are hidden by a blind spot of the camera.

12. The gaming chip recognition system according to claim 1, wherein the at least one processor is configured to recognize, by using the artificial intelligence technology, a gaming chip stack even when the chip stack consists of multiple gaming chips stacked out of alignment with each other.

13. The gaming chip recognition system according to claim 1, further comprising a database that stores information of the gaming chips.

14. The gaming chip recognition system according to claim 1, wherein the plurality of gaming chip stacks appear in the image at different sizes.

15. The gaming chip recognition system according to claim 1, wherein the at least one processor configured to:

determine an amount of each of the plurality of gaming chip stacks based on a recognized type of each gaming chip in the plurality of gaming chip stacks, the plurality of gaming chip stacks including a gaming chip stack placed by a dealer and a gaming chip stack placed by a player;

distinguish the gaming chip stack placed by the dealer from the gaming chip stack placed by the player; and determine whether the amount of the chip stack placed by the dealer matches the amount of the chip stack placed by the player.

16. A gaming chip recognition system for a casino, the gaming chip recognition system comprising:

a camera configured to capture an image of a plurality of gaming chip stacks from diagonally above the plurality of gaming chips to capture the plurality of gaming chip stacks during transit from a backyard, each gaming chip stack of the plurality of gaming chip stacks positioned a different distance from the camera; and at least one processor configured to:

perform an image analysis of the image using an artificial intelligence technology or deep learning technology to recognize the plurality of gaming chip stacks that appeared in the image; and determine respective numbers of gaming chips of each chip stack of the recognized plurality of gaming chip stacks.

17. A gaming chip recognition system for a casino, the gaming chip recognition system comprising:

a camera configured to capture an image of a plurality of gaming chip stacks from diagonally above the plurality of gaming chips to capture the plurality of gaming chip stacks; and at least one processor configured to:

perform an image analysis of the image using an artificial intelligence technology or deep learning technology to recognize the plurality of gaming chip stacks that appeared in the image;

determine respective numbers of gaming chips of each chip stack of the recognized plurality of gaming chip stacks;

for a first stack of the plurality of gaming chip stack:

recognize a position on a game table of a gaming chip included in the first stack, the position including coordinates on the game table; and based on the position of the one gaming chip, determine a purpose of the gaming chip being placed on the game table.

* * * * *